US012567519B2

(12) United States Patent
Kim et al.

(10) Patent No.: US 12,567,519 B2
(45) Date of Patent: Mar. 3, 2026

(54) POWER CABLE SYSTEM HAVING DIFFERENT CONDUCTOR CONNECTING PART, AND POWER CABLE CONNECTION METHOD HAVING DIFFERENT CONDUCTORS

(71) Applicant: LS CABLE & SYSTEM LTD., Anyang-si (KR)

(72) Inventors: Jeong Ik Kim, Seongnam-si (KR); Sung Jin Im, Gumi-si (KR); Je Hyun Lee, Gumi-si (KR); Sung Ho Hong, Yangcheon-gu (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 196 days.

(21) Appl. No.: 18/283,180

(22) PCT Filed: Dec. 9, 2021

(86) PCT No.: PCT/KR2021/018654
§ 371 (c)(1),
(2) Date: Sep. 20, 2023

(87) PCT Pub. No.: WO2022/215826
PCT Pub. Date: Oct. 13, 2022

(65) Prior Publication Data

US 2024/0177889 A1 May 30, 2024

(30) Foreign Application Priority Data

Apr. 5, 2021 (KR) ........................ 10-2021-0044282
Jun. 2, 2021 (KR) ........................ 10-2021-0071802

(51) Int. Cl.
*H01B 9/02* (2006.01)
*H01B 9/00* (2006.01)
*H01B 1/02* (2006.01)

(52) U.S. Cl.
CPC ............... *H01B 9/006* (2013.01); *H01B 1/02* (2013.01)

(58) Field of Classification Search
CPC .......... H01B 1/02; H01B 1/023; H01B 1/026; H01B 3/52; H01B 7/02; H01B 7/28;
(Continued)

(56) References Cited

U.S. PATENT DOCUMENTS 4,224,499 A * 9/1980 Jones ..................... B23K 26/32
219/121.64
9,666,955 B2 * 5/2017 Sugino ................ B60R 16/0215
(Continued)

FOREIGN PATENT DOCUMENTS

JP 5197092 B2 5/2013
KR 100984502 B1 9/2010
(Continued)

OTHER PUBLICATIONS

International Search Report for related International Application No. PCT/KR2021/018654; action dated Oct. 13, 2022; (2 pages).
(Continued)

*Primary Examiner* — William H. Mayo, III
(74) *Attorney, Agent, or Firm* — K&L Gates LLP

(57) ABSTRACT

A power cable system and method for connecting multiple power cables and conductors thereby forming a cable connection structure. The multiple conductors have different melting points. The cable connection structure having volume rate increase regions of the multiple conductors formed by preprocessing of the multiple conductors to increase durability of the conductor connecting part in the cable connection structure. The multiple conductors are connected by resistance welding.

18 Claims, 14 Drawing Sheets

(58) Field of Classification Search

CPC .. H01B 7/282; H01B 13/0023; H01B 13/062; H01R 4/02; H01R 4/021; H01R 4/0214; H01R 4/029; H01R 4/10; H01R 4/24; H01R 4/70; H01R 11/09; H01R 11/11; H01R 12/63; H01R 43/02; H01R 43/0214; H02G 1/145; H02G 15/08; H02G 15/28

USPC ........... 174/74 R–93; 29/869, 868, 870, 871, 29/872, 873

See application file for complete search history.

(56) References Cited

U.S. PATENT DOCUMENTS

| | | | | |
|---|---|---|---|---|
| 9,991,026 | B2 * | 6/2018 | Kanagawa | H01B 13/0036 |
| 10,118,573 | B2 * | 11/2018 | Nakai | H02G 3/0487 |
| 11,114,825 | B2 * | 9/2021 | Tanaka | H01R 4/029 |
| 2006/0121773 | A1 * | 6/2006 | Ichikawa | H01R 13/53 439/408 |
| 2009/0249616 | A1 * | 10/2009 | Froschl | H01R 4/625 29/745 |
| 2010/0108666 | A1 * | 5/2010 | Gafri | B23K 20/129 219/603 |
| 2012/0318554 | A1 * | 12/2012 | Koto | H01R 4/625 29/869 |
| 2014/0110459 | A1 * | 4/2014 | Kataoka | H01R 4/021 228/173.1 |
| 2020/0136277 | A1 | 4/2020 | Toshida et al. | |
| 2021/0020681 | A1 * | 1/2021 | Kwag | H10F 39/8037 |
| 2022/0172864 | A1 * | 6/2022 | Kim | B23K 11/02 |

FOREIGN PATENT DOCUMENTS

| | | | | |
|---|---|---|---|---|
| KR | 20120004111 | A * | 1/2012 | H01B 13/02 |
| KR | 101128106 | B1 | 3/2012 | |
| KR | 20160051563 | A | 5/2016 | |
| KR | 20180070228 | A | 6/2018 | |
| KR | 20200069967 | A | 6/2020 | |

OTHER PUBLICATIONS

Written Opinion for related International Application No. PCT/KR2021/018654; action dated Oct. 13, 2022; (4 pages).

Extended European Search Report for related European Application No. 21936164.9; action dated Mar. 26, 2025; (18 pages).

* cited by examiner

Prior Art

POWER CABLE SYSTEM HAVING DIFFERENT CONDUCTOR CONNECTING PART, AND POWER CABLE CONNECTION METHOD HAVING DIFFERENT CONDUCTORS

CROSS-REFERENCE TO RELATED APPLICATIONS

The present application is a National Stage of International Application No. PCT/KR2021/018654 filed on Dec. 9, 2021, which claims the benefit of Korean Patent Application No. 10-2021-0044282, filed on Apr. 5, 2021, and Korean Patent Application No. 10-2021-0071802, filed on Jun. 2, 2021 with the Korean Intellectual Property Office, the entire contents of which are hereby incorporated by reference.

FIELD

The present disclosure relates to a power cable system having a different conductor connecting part and a method of connecting power cables having different types of conductors. More specifically, the present disclosure relates to a power cable system with a different conductor connecting part that secures sufficient bending strength to prevent damage thereto and ensure durability even when both a tensile force and bending are applied to connect power cables with different types of conductors, and a method of connecting power cables with different types of conductors.

BACKGROUND

A power cable that supplies power may include a copper or aluminum-based conductor, an insulating layer, a semi-conducting layer, an external jacket, and the like.

A cable for power transmission includes a conductor and an insulator, and the conductor is required to have high electrical conductivity to minimize loss of electric energy. Copper and aluminum are conductor materials that have high electrical conductivity and are excellent in terms of price competitiveness. Copper is better than aluminum in terms of electrical and mechanical properties except density. Copper has been generally applied to a conductor of a cable for power transmission, and an aluminum conductor has been restrictively applied to an overhead transmission wire or the like for which lightweight properties is considered as important.

However, as the price of copper raw materials rises, the price of copper is four to six times higher than that of aluminum of the same weight as copper and thus the demand for applying an aluminum conductor to a power transmission cable is increasing. Because copper has been generally applied to conductors of existing cables, it is expected that the demand for direct connecting of a copper conductor and an aluminum conductor will increase with the widespread use of aluminum.

As a conductor material, copper is higher in electrical conductivity than aluminum but is expensive, and aluminum is lower in electrical conductivity than copper but is cheaper.

Generally, a conductor consisting of a plurality of wires is used as a conductor of a power cable in consideration of flexibility and the like. For intermediate connection of power cables with different types of conductors formed of different materials, e.g., a power cable with a copper conductor and a power cable with an aluminum conductor, the different types of conductors may be connected by welding. However, because a melting point of the aluminum conductor is low, when welding is performed at a temperature between a melting point of the copper conductor and the melting point of the aluminum conductor, there may gaps between a plurality of wires of the copper conductor and an oxide coating may form along each of the gaps in a high-temperature welding environment, thus causing the deterioration of welded portions.

In Korean Patent Registration No. 10-1128106 and the like, a method of connecting conductors by using a dedicated sleeve member for connecting different types of conductors such as copper and aluminum conductors is used. The sleeve member may include a first metal part with an insertion hole into which a first conductor formed of copper or the like is inserted, and a second metal part with a connecting surface on which an aluminum-based second conductor is Mig or Tig welded.

The first and second conductors may be connected by inserting and compressing the first conductor formed of copper or the like in the insertion hole in one side of the sleeve member and connecting the aluminum-based second conductor on the connecting surface corresponding to the other side of the sleeve member.

The sleeve member that is in a metal junction form is expensive and two processes, i.e., compression and welding, are additionally required to be performed through the sleeve member. Thus, problems such as an increase in costs and the number of processes may occur.

To solve the above problems, Korean Laid-Open Patent Application No. 10-2020-0069967 discloses a structure and method for connecting different types of conductors by resistance welding without using a sleeve member. However, it was confirmed that a conductor connecting part of a connection box cracked when a tensile bending test, which is one of performance tests of a connection box of a submarine power cable, was conducted by applying a tensile force while a pair of submarine cables with different types of conductors connected through the connection box were bent at a certain radius of curvature.

FIG. 23 is an enlarged view of a different conductor connecting part 11' after a tensile bending test was conducted on a power cable with a copper conductor, a power cable with an aluminum conductor, and a power cable system including an intermediate connection structure configured as a conductor connecting part by the method disclosed in Korean Laid-Open Patent Application No. 10-2020-0069967.

It is confirmed that in the case of a different conductor connecting part to which a first conductor 10A, which is a copper conductor, and a second conductor 10B, which is an aluminum conductor, are connected without a sleeve member by the method disclosed in Korean Laid-Open Patent Application No. 10-2020-0069967, the different conductor connecting part exhibited tensile strength when only a horizontal tensile force was applied. However, as shown in FIG. 23, in a tensile bending test according to a cable customer's test standard, when both bending and a tensile force were applied, damages such as deformation, fractures, and cracks did not occur in regions of the first conductor 10A and the second conductor 10B, which are conductor regions, but cracks C occurred in the different conductor connecting part.

That is, it can be understood that the cracks C occurred, because the bending strength of the different conductor connecting part 11' was lower than that of the first conductor 10A, which is a copper conductor region and that of the second conductor 10B, which is an aluminum conductor region, and sufficient bending strength of the different conductor connecting part 11' was not secured.

FIG. 24 illustrates a first conductor 10A and a second conductor 10B on which a fracture br occurred in a tensile bending test performed on a power cable with an intermediate connection structure to which the first conductor 10A and the second conductor 10B were connected using a connection conductor, which includes a first metal part formed of copper similar to the first conductor 10A and including an insertion portion and a second metal part formed of aluminum similar to a second conductor 10B and including a protrusion among different types of conductors as disclosed in Korean Laid-open Patent Application No. 10-2020-0069969 and is configured by inserting the protrusion of the second metal part into the insertion portion of the first metal part and connecting the protrusion and the insertion portion by friction welding, by a method of connecting different types of conductors.

Similarly, a connecting part structure disclosed in Korean Laid-Open Patent Application No. 10-2020-0069969 exhibited sufficient tensile strength when only a horizontal tensile force was applied but a conductor connecting part was broken causing a fracture br when both bending and a tensile force were applied. Similarly, the horizontal tensile force or the like was withstood due to a stopping structure obtained by connecting the insertion portion, which is provided with a stopping groove, and the protrusion portion near the conductor connecting part but sufficient bending strength was not secured in an environment in which both a curve and bending are provided.

Therefore, in order to secure sufficient durability of an intermediate connection structure for power cables having different types of conductors even in a submarine environment, a method of improving the bending strength of a conductor connecting part of an intermediate connection structure for power cables having different types of conductors is required.

SUMMARY

The present disclosure is directed to providing a power cable system with a different conductor connecting part that secures sufficient bending strength to prevent damage thereto and ensure durability even when both a tensile force and bending are applied to connect power cables having different types of conductors, and a method of connecting power cables having different types of conductors.

To achieve these objects, the present disclosure provides a power cable system, which includes a first power cable with a first conductor, a second power cable with a second conductor, and a cable connection structure for connecting the first power cable and the second power cable, wherein the first conductor of the first power cable comprises a plurality of wires, the second conductor of the second power cable comprises a plurality of wires and is formed of a material different from a material of the first conductor, a melting point of the first conductor is higher than that of the second conductor, the cable connection structure comprises a different conductor connecting part formed by connecting the first conductor and the second conductor, the different conductor connecting part comprises a volume rate increase region of the first conductor and a volume rate increase region of the second conductor, and is formed by forming the volume rate increase region of the first conductor by preprocessing the first conductor to increase a volume rate by a certain length from a connecting surface (cs1) of the first conductor, forming the volume rate increase region of the second conductor by preprocessing the second conductor to reduce a volume rate by a certain length from a connecting surface (cs2) of the second conductor, and connecting the first conductor and the second conductor by resistance welding.

And the preprocessing of the first conductor may comprise connecting a pair of first conductors by welding and cutting a connecting part between the pair of first conductors to obtain a cut surface as the connecting surface (cs1) of the first conductor.

And due to the preprocessing of the first conductor, the volume rate may increase by the certain length from the connecting surface (cs1) of the first conductor is 98% or more.

And the first conductor may be formed of copper or a copper alloy, and the second conductor may be formed of aluminum or an aluminum alloy.

And the preprocessing of the second conductor may comprise forming a melt penetration path to extend from the connecting surface (cs2) in a longitudinal direction of the second conductor before the connecting of the first conductor and the second conductor.

And due to the preprocessing of the second conductor, the volume rate may be reduced by the certain length from the connecting surface (cs2) of the second conductor is 90% or less.

And the melt penetration path may be formed by drilling multiple points on the connecting surface (cs2) of the second conductor by a drill.

And the melt penetration path may be formed by partially cutting and removing the plurality of wires of the second conductor from the connecting surface (cs2) of the second conductor by using a cutting tool.

And a volume rate of the volume rate increase region of the second conductor may be 98% or more in a range of at least 3 mm from the connecting surface (cs) in a longitudinal direction of the second conductor.

And a diameter of the first conductor may be less than that of the second conductor.

And an O-ring with an inclined outer circumferential surface may be bonded on the different conductor connecting part to finish a step caused by the difference in diameter between the first conductor and the second conductor to have an inclined surface.

And the different conductor connecting part may be formed by connecting the first conductor and the second conductor by resistance welding.

And the first conductor or the second conductor may comprise a circularly compressed conductor.

And the first conductor or the second conductor may comprise a flat conductor.

And, to achieve these objects, the present disclosure provides a power cable system, which includes a first power cable with a first conductor, a second power cable with a second conductor, and a cable connection structure for connecting the first power cable and the second power cable, wherein the first conductor of the first power cable comprises a plurality of wires, the second conductor of the second power cable comprises a plurality of wires and is formed of a material different from a material of the first conductor, a melting point of the first conductor is higher than that of the second conductor, the cable connection structure comprises a different conductor connecting part formed by connecting the first conductor and the second conductor, the different conductor connecting part comprises a volume rate increase region of the first conductor and a volume rate increase region of the second conductor with respect to a connecting surface (cs), and bending strength of the different conductor connecting part is greater than that of the second conductor.

And a volume rate of the volume rate increase region of the second conductor may be 98% or more in a range of at least 3 mm from the connecting surface (cs) in a longitudinal direction of the second conductor.

And the first conductor may be formed of copper or a copper alloy, and the second conductor may be formed of aluminum or an aluminum alloy.

And a diameter of the first conductor may be less than that of the second conductor.

And an O-ring with an inclined outer circumferential surface may be bonded on the different conductor connecting part to finish a step caused by the difference in diameter between the first conductor and the second conductor to have an inclined surface.

And the different conductor connecting part may be formed by connecting the first conductor and the second conductor by resistance welding.

And the volume rate increase region of the first conductor may be processed to increase a volume rate by a predetermined length before welding of the first conductor and the second conductor.

And the first conductor may be processed by a certain length from a connecting surface (cs1) thereof to achieve a volume rate of 98% or more before connecting with the second conductor.

And the processing of the first conductor by the certain length from the connecting surface (cs1) thereof to increase a volume rate to a predetermined level or more may comprise connecting a pair of first conductors by welding and cutting a connecting part between the pair of first conductors to achieve a cut part as the connecting surface (cs) of the first conductor.

And before the connecting of the first conductor and the second conductor, the second conductor may be processed to achieve a volume rate equal to or less than a predetermined level by forming a melt penetration path to extend from a connecting surface (cs2) of the second conductor in a longitudinal direction of the second conductor.

And the second conductor may be processed to achieve a volume rate of 90% or less.

And the melt penetration path may be formed by drilling a plurality of points on the connecting surface (cs2) of the second conductor by a drill.

And the melt penetration path may be formed by partially cutting and removing the plurality of wires of the second conductor from the connecting surface (cs2) of the second conductor by using a cutting tool.

And the first conductor or the second conductor may comprise a circularly compressed conductor.

And the first conductor or the second conductor may comprise a flat conductor.

And, to achieve these objects, the present disclosure provides a power cable connection method of connecting a first power cable with a first conductor including a plurality of circular wires and a second power cable with a second conductor including a plurality of circular wires and formed of a material different from a material of the first conductor, the power cable connection method comprising: preprocessing the first conductor by a certain length from a connecting surface (cs1) of the first conductor to increase a volume rate to a predetermined level or more; preprocessing the second conductor by a certain length from a connecting surface (cs2) of the second conductor to reduce a volume rate to a predetermined level or more; and performing resistance welding to bond the connecting surface (cs1) of the first conductor and the connecting surface (cs2) of the second conductor to form a different conductor connecting part.

And the performing of the resistance welding may be performed by conducting a current to the first and second conductors to melt and pressurize the first and second conductors.

And in the performing of resistance welding, an exposed length of the first conductor may be less than that of the second conductor on welding jigs for welding the first and second conductors.

And the preprocessing of the first conductor may be performed by forming a connecting part by connecting a pair of first conductors by welding to achieve a volume rate of 98% or more of a certain length from the connecting surface (cs1) of the first conductor and cutting the connecting part to obtain a cut surface as the connecting surface (cs1) of the first conductor.

And the preprocessing of the second conductor may be performed by forming a melt penetration path to extend by a predetermined length from the connecting surface (cs2) of the second conductor before the connecting with the first conductor to achieve a volume rate of 90% or less of a certain length from the connecting surface (cs2) of the second conductor.

And after the performing of the resistance welding, a volume rate of the volume rate increase region of the second conductor of the different conductor connecting part may be 98% or more in a range of at least 3 mm from the connecting surface (cs2) in a longitudinal direction of the second conductor.

And in the performing of the resistance welding, welding temperature may be lower than a melting point of the first conductor, and may be 5 to 15% higher than a melting point of the second conductor.

In a power cable system with a different conductor connecting part and a method of connecting power cables having different types of conductors according to the present disclosure, even when both a tensile force and bending are applied, a conductor volume rate at the different conductor connecting part can be increased to ensure sufficient bending strength, thereby preventing damage to the different conductor connecting part and improving the durability and reliability of an intermediate connection structure.

In addition, in the power cable system with the different conductor connecting part and the method of connecting power cables having different types of conductors according to the present disclosure, the workability of connecting different types of conductors can be improved by applying upset butt welding.

BRIEF DESCRIPTION OF THE DRAWINGS

FIG. 3 illustrates a process of cutting a connecting part between the pair of first conductors along a cut line after removing a burr on the connecting part between the connected first conductors.

DETAILED DESCRIPTION

Figure 1:
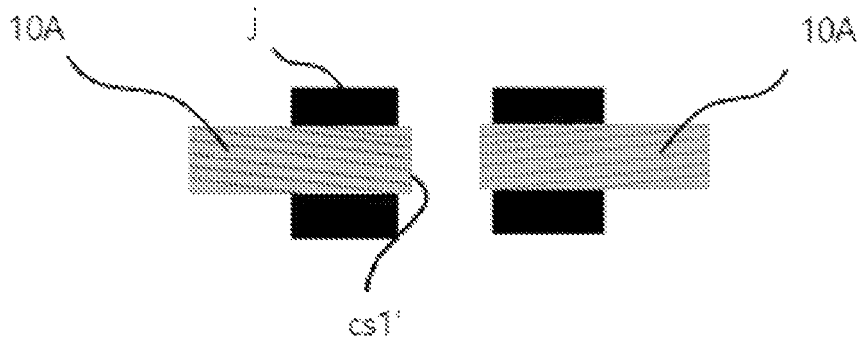
FIG. 1 illustrates a state in which a pair of copper circular compression conductors, which are a pair of first conductors, are mounted on welding jigs.

Hereinafter, embodiments of the present disclosure will be described in detail with reference to the accompanying drawings. The present disclosure is, however, not limited thereto and may be embodied in many different forms. Rather, the embodiments set forth herein are provided so that this disclosure may be thorough and complete and fully convey the scope of the disclosure to those skilled in the art. Throughout the specification, the same reference numbers represent the same elements.

The suitability of a conductor of a power cable may be changed according to an environment (the land, the sea bottom or the like) at which the power cable is to be installed, in consideration of costs and the like. Intermediate connection may be performed when the types of conductors of power cables are different from each other according to conductor properties of a power cable required for each section.

When the types of conductors of power cables to be connected by intermediate connection are different, a melting point or the like may be different and there may be the difference between degrees of oxide coating may occur and thus it is difficult to guarantee the quality of connecting at a connecting part by a conventional connecting method.

In addition, various types of conductors such as a circular compressed conductor consisting of stranded and compressed circular wires or a flat conductor consisting of flat wire layers formed of stranding flat wires may be used as the conductors. First, a method of connecting different types of circular compressed conductors will be described in relation to a method of connecting a pair of conductors.

According to the present disclosure, in order to form an intermediate connection structure for connecting a first power cable and a second power cable, when a different conductor connecting part is formed by connecting a first conductor, which includes a plurality of circular or flat wires, of the first power cable and a second conductor, which includes a plurality of circular or flat wires, of the second power cable, a volume rate increase region of the first conductor and a volume rate increase region of the second conductor may be formed at the different conductor connecting part with respect to a connecting surface to secure sufficient bending strength, thereby preventing the occurrence of deformation, fractures, cracks, etc. at the different conductor connecting part, as will be described in detail below.

In the following description, a conductor of each power cable will be described as, for example, a circular compressed conductor consisting of stranded and compressed circular wires but the same conductor connecting method may be applied to a flat conductor consisting of flat wires although the flat conductor is different from the circular compressed conductor in terms of a shape.

The conductor volume rate, which is an indicator for identifying an empty space in a conductor of a certain volume, refers to a volume occupied by the conductor, excluding empty spaces between wires, relative to a total volume (=cross-sectional area of conductor×length of conductor) defined by an outer circumference of the conductor, and is defined by Equation 1 below. As the conductor volume rate increases, an empty space decreases.

[Equation 1]

$$\text{volume rate of conductor (\%)} = \frac{\text{volume occupied by conductor}}{\text{total volume (crosssectional area of conductor} \times \text{length of conductor)}} \times 100$$

The conductor volume rate is a concept similar to a space factor based on a cross section of the conductor but is the concept of volume in which a variable of the conductor in a longitudinal direction is reflected and thus may be differentiated from the space factor.

FIGS. 1 to 6 illustrate a conceptual diagram of a process of increasing a copper volume rate by a certain length from the connecting surface cs1 of the first conductor 10A, which is a circular compressed conductor formed of copper, to be greater than or equal to a predetermined level, and an image thereof.

When a copper (or a copper alloy-containing) conductor and an aluminum (or an aluminum alloy-containing) conductor are connected by resistance welding, there are gaps at a connecting surface of the copper conductor and a thick oxide coating is formed due to a low melting point of the aluminum conductor during the welding of the conductors at temperature between a melting point of the copper conductor and the melting point of the aluminum conductor, thus resulting in the deterioration of the quality of a connecting part.

Therefore, according to the present disclosure, a process of increasing a conductor volume rate by a certain length from a connecting surface cs1 of a copper conductor with a high melting point to be greater than or equal to a predetermined level may be performed before resistance welding of the copper conductor and an aluminum conductor, which are circular compressed conductors.

That is, the connecting surface of the copper conductor, which is a circular compressed conductor, may be provided while gaps and the like are removed or minimized to suppress the generation of an oxide coating and the like during welding, thereby improving the quality of connecting at a connecting part to which the conductors are connected by welding or the like.

Meanwhile, a conductor volume rate of 100% may be understood to mean a state in which there is no gap in a conductor.

Therefore, the increasing of the conductor volume rate by the certain length from the connecting surface cs1 of the copper conductor to be greater than or equal to the predetermined level should be understood as a process of reducing a rate of empty spaces in the copper conductor to be less than or equal to a predetermined level.

A process of increasing a conductor volume rate by a certain length from the connecting surface cs1 of a first conductor, which is a copper conductor, to be connected with a second conductor, which is an aluminum conductor, to be greater than or equal to the predetermined level will be described in detail below.

Figure 2:
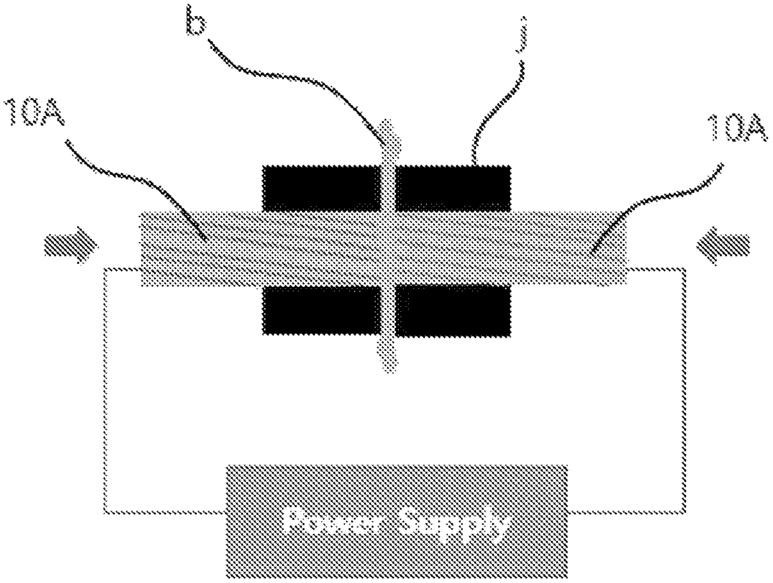
FIG. 2 illustrates a process of connecting the pair of first conductors by resistance welding.

FIG. 1 illustrates a state in which a pair of first conductors 10A, which are a pair of copper circular compressed conductors, are mounted on welding jigs j. FIG. 2 illustrates a process of connecting the pair of first conductors 10A by resistance welding. FIG. 3 illustrates a process of removing a bur from a connecting part between the connected first conductors 10A and cutting the joint along a cut line.

As shown in FIGS. 1 to 3, a method of connecting welding connecting surfaces cs1' of the first conductors 10A formed of the same material by resistance welding, removing a bur b from a connecting part 11', and cutting the connecting part 11' along a cut line cl to obtain a new connecting surface cs1 may be used in a process of processing a connecting surface of the first conductor 10A with a relatively high melting point to achieve a space factor greater than or equal to a predetermined level. For welding of the connecting surfaces cs1' of the pair of first conductors 10A, upset butt welding may be used but embodiments are not limited thereto.

Figure 4:
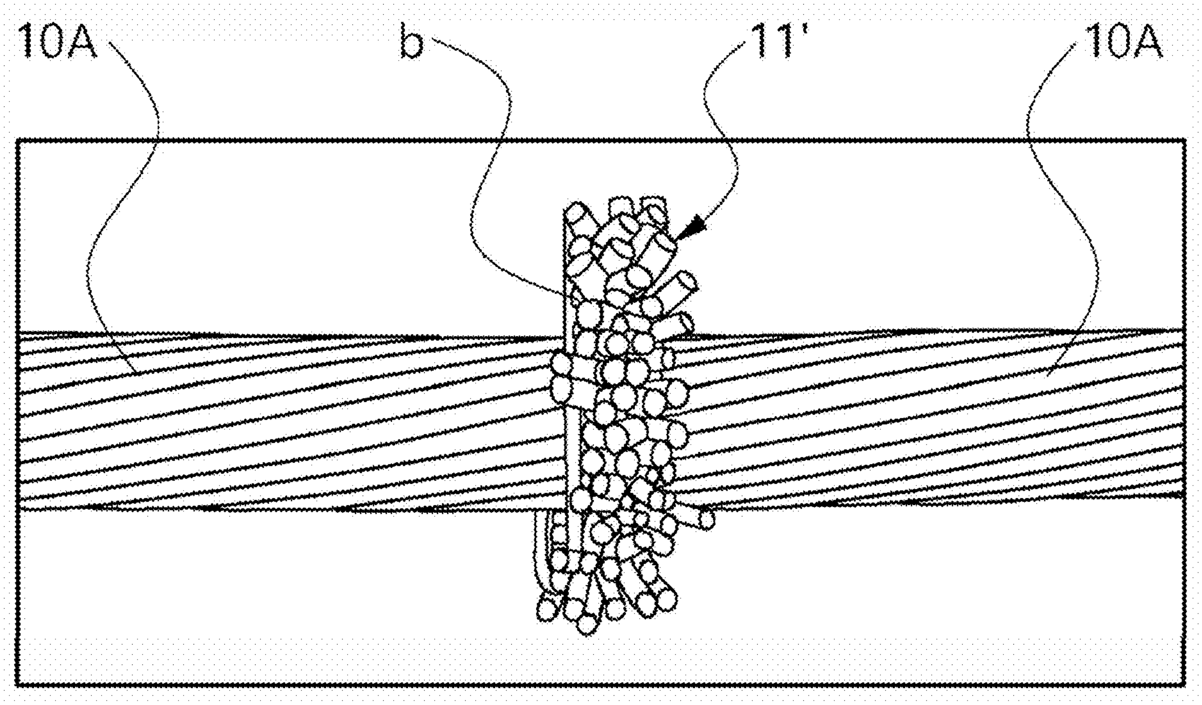
FIG. 4 illustrates an image of a state in which a pair of first conductors formed of copper are connected.
Figure 5:
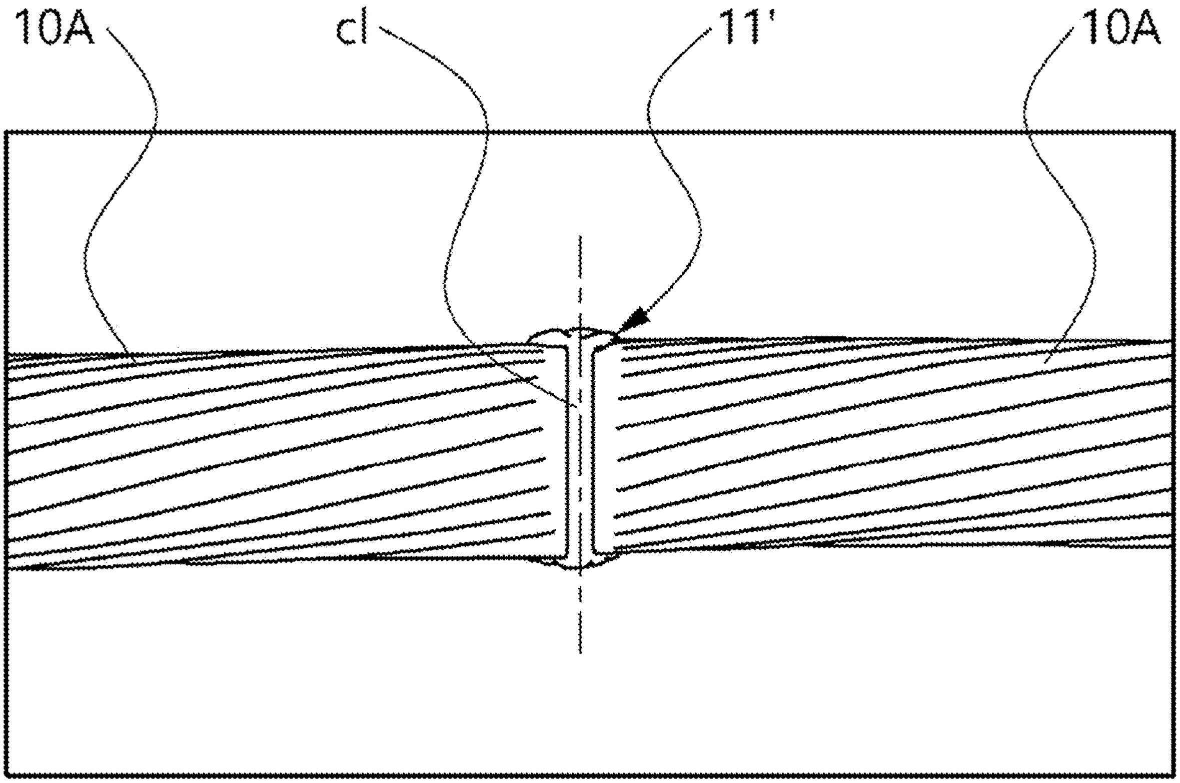
FIG. 5 illustrates an image of a state in which a bur is removed from a connecting part between the pair of first conductors of FIG. 4.
Figure 6:
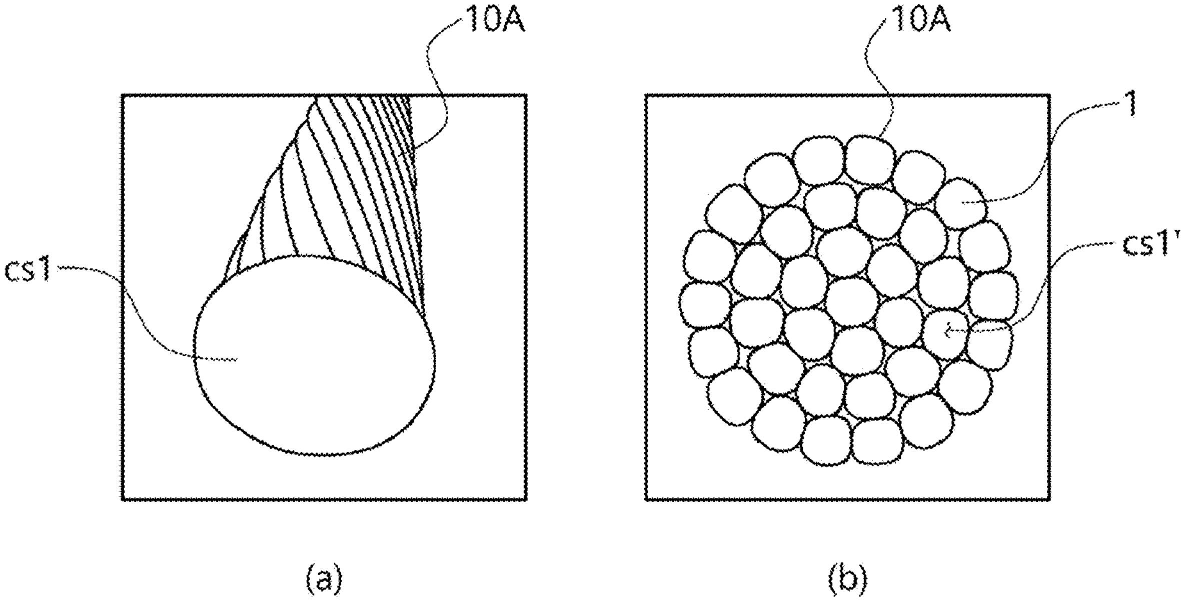
FIG. 6A illustrates an image of a new connecting surface of a first conductor obtained by cutting a connecting part between the pair of first conductors.
FIG. 6B illustrates an original connecting surface of the first conductor before the pair of first conductors are connected by resistance welding.

FIG. 4 illustrates an image of a state in which a pair of first conductors 10A formed of copper are connected. FIG. 5 illustrates an image of a state in which a bur is removed from a connecting part 11' between the pair of first conductors 10A of FIG. 4. FIG. 6A illustrates an image of a new connecting surface cs1 of the first conductors 10A obtained by cutting the connecting part 11' between the pair of first conductors 10A. FIG. 6B illustrates an original connecting surface cs1' of the first conductors 10A before the pair of first conductors 10A are connected by resistance welding.

As shown in FIGS. 4 and 5, when the pair of first conductors 10A are welded and recrystallized by upset butt welding or the like while generating a bur b during compression, and the recrystallized connecting part 11' is cut, a new connecting surface cs1 which is a cut surface of the first conductor 10A may be processed to be a smooth metal surface on which gaps occurring in a circular compressed conductor are hardly found as shown in FIG. 6A, and be processed to increase a conductor volume rate by a certain length from the connecting surface cs1.

That is, through the preprocessing shown in FIGS. 1 to 5, a first conductor 10A may be processed and changed from a state of FIG. 6B, in which there are multiple gaps between the wires 1 of the first conductor 10A and thus a space factor of an original connecting surface cs1' and a conductor volume rate are relatively low, to a state of FIG. 6A, in which a space factor of a connecting surface cs1 and a conductor volume rate increased by a certain length are very high.

As described above, the process of increasing the space factor of the connecting surface cs1 of the first conductor 10A with a higher melting point among the first conductor 10A and the second conductor 10B to be connected with each other, and increasing a conductor volume rate by a certain length of the first conductor 10A to be greater than or equal to predetermined levels may be considered as a process of changing a conductor in a connecting part region into a cylindrical shaped solid conductor, i.e., conductor with minimal voids at the connecting surface.

In the process of increasing the conductor volume rate by the certain length from the connecting surface cs1 of the first conductor 10A to be greater than or equal to a predetermined level, a method of recrystallizing the connecting surface cs1' of the first conductor 10A by heating the connecting surface cs1' by a heating jig with a melting point higher than that of the first conductor 10A may be used rather than the method of connecting the pair of first conductors 10A and cutting the connecting part 11' as shown in FIGS. 1 to 6.

A conductor volume rate of the certain length from the new connecting surface cs1 of the first conductor 10A is preferably about 98% that is higher than the volume rate of a general circular compressed conductor.

Meanwhile, in order to further increase the conductor volume rate by a certain length from the new connecting surface cs1 of the first conductor 10A formed by cutting the connecting part 11' in FIGS. 3 to 5, at least one melt penetration path (see reference numeral 4 in FIGS. 7 to 12) may be formed on and inside a connecting surface cs1' of at least one of the pair of first conductors 10A before the connecting of the pair of first conductors 10A shown in FIGS. 1 to 5. As will be described below, a molten material of the first conductor 10A is introduced into the second conductor 10B during the connecting of the pair of first conductors 10A, thereby increasing a volume rate. For example, the at least one melt penetration path may be regions (see FIGS. 7 to 9) obtained by forming holes in the connecting surface cs1' of the first conductor 10A by a drill or the like or by cutting circular wires to reduce the diameters thereof or remove the circular wires.

Specifically, multiple holes may be formed or multiple wires may be cut to achieve a volume rate of 90% or less for a certain length of the connecting surface cs1' of the first conductor 10A in a longitudinal direction. In this case, the at least one melt penetration path may be dispersed in the connecting surface cs1' of the first conductor 10A.

Figure 7:
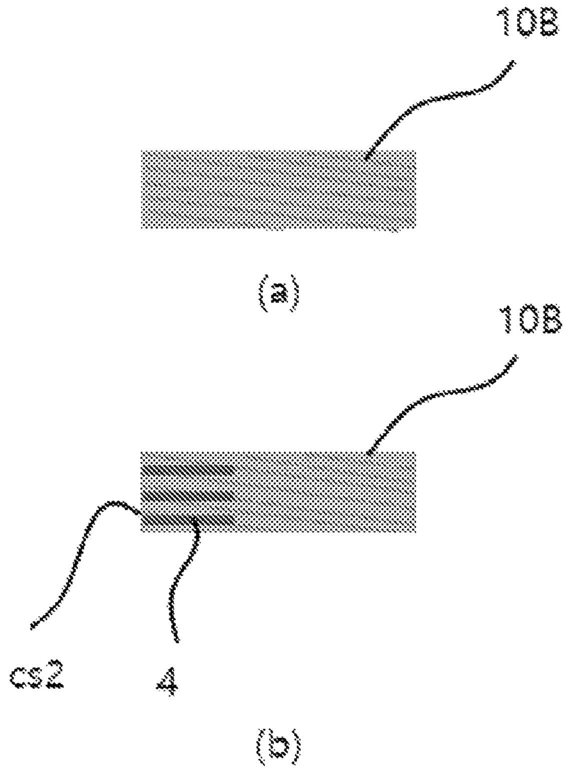
FIGS. 7 to 9 are conceptual diagrams illustrating a process of forming a melt penetration path on a connecting surface of a second conductor that is an aluminum-based circular compressed conductor or flat conductor according to the present disclosure.
Figure 8:
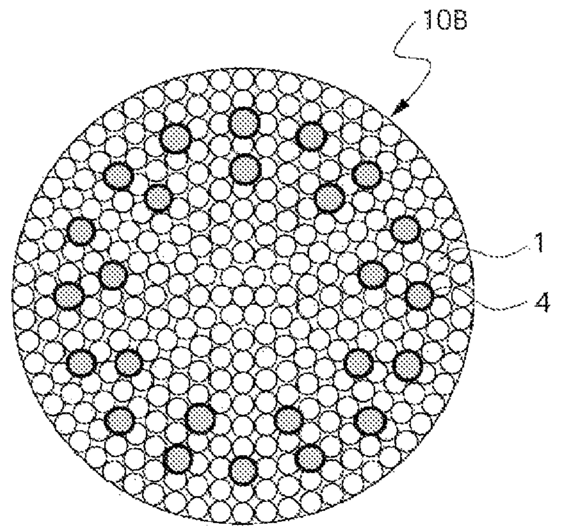
Figure 9:
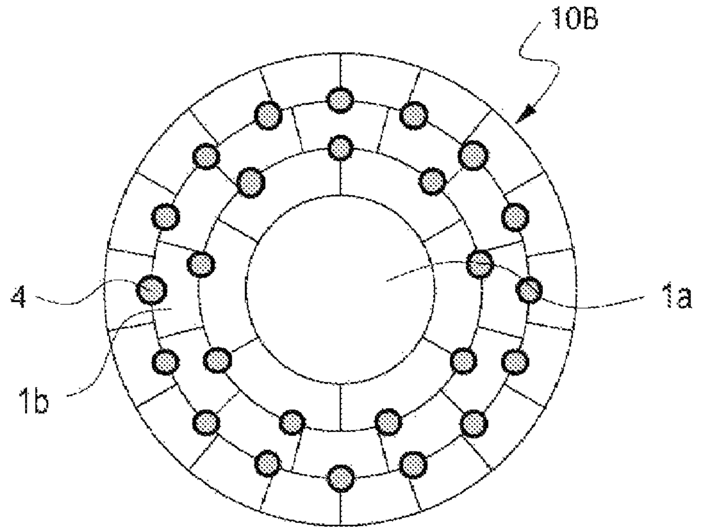

FIGS. 7 to 9 are conceptual diagrams illustrating a process of forming a melt penetration path on a connecting surface of a second conductor that is an aluminum-based circular compressed conductor or flat conductor.

As described in the background art section, in the methods disclosed in Korean Laid-open Patent Application 10-2020-0069967, etc., a sleeve member can be omitted when a copper-based first conductor 10A and an aluminum-based second conductor 10B were connected but a connecting part cracked in a tensile bending test or the like.

This defect occurs because bending strength at a connecting part region between the first conductor 10A and the second conductor 10B when both a tensile force and bending are applied.

Here, the "bending strength" may be defined as maximum stress applied to a sample until damage such as deformation, fractures, or cracks was occurred in the sample.

According to the present disclosure, it was confirmed that when the first conductor 10A and the second conductor 10B, which are different types of conductors, were connected by resistor welding or the like, a molten material was introduced into these conductors to form conductor volume rate increase regions, thereby improving bending strength of a different conductor connecting part.

That is, according to the present disclosure, a different conductor connecting part formed by connecting a first conductor and a second conductor includes a volume rate increase region of the first conductor and a volume rate increase region of the second conductor with respect to a connecting surface cs, thereby improving bending strength of the different conductor connecting part.

To this end, as described above, the volume rate increase region of the first conductor with a relatively high melting point is formed by preprocessing the first conductor to increase a volume rate by a certain length, and thus, an area of the first conductor to be connected with the second conductor may be maximized to increase connecting strength.

In contrast, because the second conductor with a relatively low melting point is melted when upset butt welding is performed to bond the second conductor with the first conductor, a process of increasing a volume rate by a certain length from a connecting surface by preprocessing is not needed.

Accordingly, according to the present disclosure, in order to form the volume rate increase region of the second conductor, a melt penetration path is formed to extend by a certain length from a connecting surface of the second conductor by a method, which will be described below, to reduce a volume rate, and a molten material generated as the second conductor with a relatively low melting point is melted during resistance welding with the first conductor is introduced through the melt penetration path, so that the volume rate of a second conductor region of a connecting part may increase in a state in which the connecting of the first and second conductors is completed, thereby increasing bending strength.

Specifically, FIG. 7 is a conceptual diagram for describing a concept of forming a melt penetration path in the second conductor 10B formed of an aluminum according to the present disclosure.

As shown in FIG. 7A, the second conductor 10B may be a circular compressed conductor formed by compressing a plurality of circular wires 1 into a circular shape, but gaps between the circular wires 1 cannot be completely removed even the circular wires 1 are aggregated and compressed.

As described above, even when a volume rate of a certain length from a connecting surface of a different conductor connecting part in a direction toward the second conductor 10B with the relatively low melting point is not sufficient, tensile strength with respect to a horizontal tensile force may be secured but when bending is applied together with the tensile force, damages such as deformation, fractures or cracks may occur. Thus, the volume rate increase region of the second conductor 10B is formed on an assumption that bending strength applied at a conductor connecting part of different types of conductors is proportional to a volume rate of a certain length from the connecting surface of the different conductor connecting part in the direction toward the second conductor 10B with the relatively low melting point. To this end, preprocessing is performed to reduce a volume rate of a predetermined-length section of the connecting surface of the second conductor 10B to be connected before upset butt welding of the first conductor 10A and the second conductor 10B.

That is, according to the present disclosure, as shown in FIG. 7B, at least one melt penetration path 4 is formed on and inside the connecting surface cs2 of the second conductor 10B before the connecting of the second conductor 10B to perform preprocessing to increase a volume rate by a certain length to the second conductor 10B with a low melting point from the connecting surface cs of the different conductor connecting part to which the first and second conductors 10A and 10B are connected.

The melt penetration path 4 of FIG. 7B may be regions obtained by forming holes in the connecting surface cs2 of the second conductor 10B by a drill or the like or by cutting circular wires by a certain length to reduce the diameters thereof or remove the circular wires. Multiple holes may be formed or multiple wires may be cut to achieve a volume rate of 90% or less of a certain length of the connecting surface cs2 of the second conductor 10B in the longitudinal direction.

In addition, the melt penetration path 4 may cause a molten material of the second conductor 10B to be introduced during the connecting of the first and second conductors 10A and 10B to increase a volume rate, thereby improving bending strength. Thus, melt penetration paths 4 are preferably dispersed on the connecting surface cs2 of the second conductor 10B.

FIG. 8 illustrates a cross section of a second conductor 10B that is an aluminum circular compressed conductor formed by compressing multiple circular wires, and FIG. 9 illustrates a cross section of a second conductor 10B that is an aluminum flat conductor including multiple flat wires.

To form a melt penetration path 4 in the second conductor 10B shown in FIG. 8 or 9, a method of forming multiple holes to a certain depth by a drill may be used but cutting may be used instead of drilling.

When the melt penetration path 4 is formed in the connecting surface cs2 of the second conductor 10B, the number of holes to be formed by a drill may be determined such that a volume rate of the second conductor 10B in the depth to which the melt penetration path 4 is formed may be 90% or less. The melt penetration path 4 is preferably concentrically distributed with respect to the center of the second conductor 10B to ensure bending strength regardless of a direction of bending.

Therefore, when the second conductor 10B in which the melt penetration path 4 is formed by drilling or cutting is connected with the first conductor 10A processed to have a conductor volume rate of about 98% or more of a certain length from the connecting surface cs1, an aluminum molten material penetrates through the melt penetration path 4 during resistance welding, thus increasing a volume rate by the certain length.

Experimentally, when before the connecting of the first conductor 10A and the second conductor 10B, resistance welding was performed in a state in which a volume rate of a certain length from the connecting surface cs2 of the second conductor 10B was reduced to 90% or less by forming a melt penetration path to extend by a certain length from the connecting surface cs2 of the second conductor 10B, a second-conductor volume rate increase region 11B extending by the certain length from the connecting surface cs of the different conductor connecting part 11 in a direction toward the second conductor 10B was secured after the connecting of the first conductor 10A and the second conductor 10B. Preferably, a conductor volume rate of the second-conductor volume rate increase region 11B may be 98% or more. The length of the melt penetration path 4 on the connecting surface cs2 of the second conductor 10B is preferably at least 20 mm.

Figure 10:
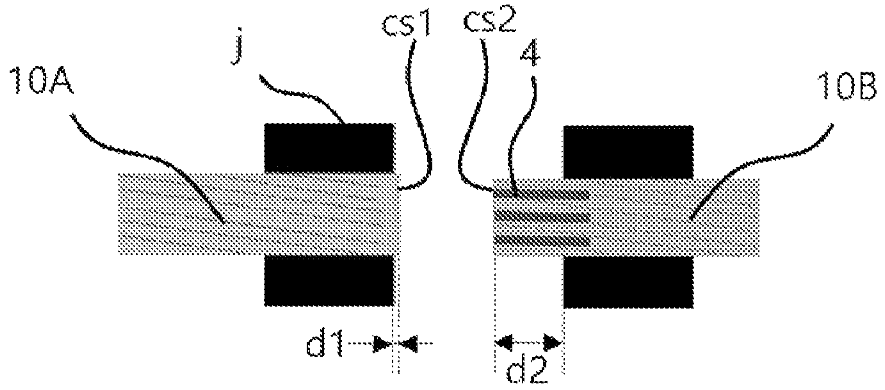
FIG. 10 illustrates a state in which a copper circular compressed conductor as a first conductor and an aluminum circular compressed conductor as a second conductor are mounted on welding jigs.
Figure 11:
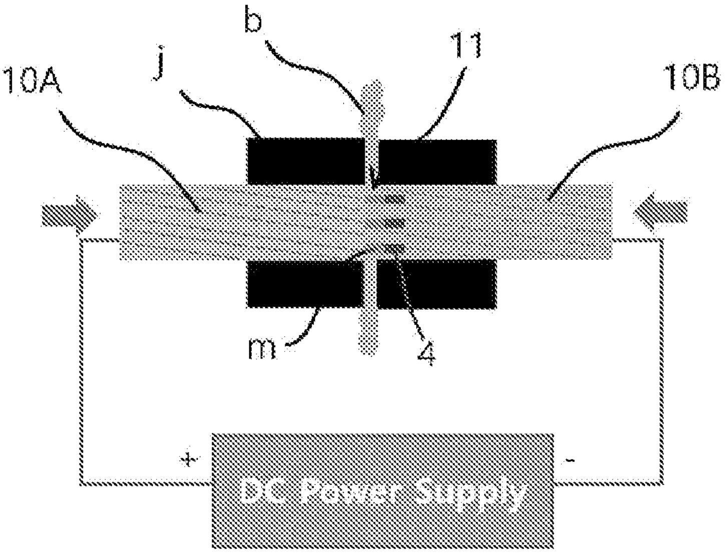
FIG. 11 illustrates a process of connecting surfaces of the first conductor and the second conductor by resistance welding.
Figure 12:
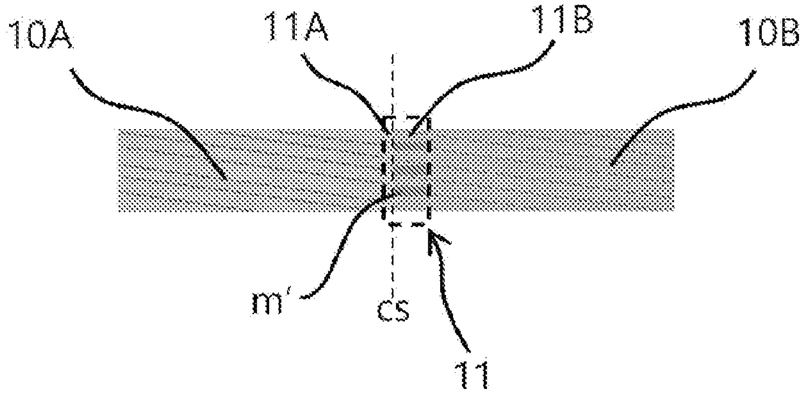
FIG. 12 illustrates a state in which the connecting of the first and second conductors is completed after a bur is removed from a connecting part between the connected first and second conductors.

FIG. 10 illustrates a state in which a copper conductor and an aluminum circular, which is a pair of a first conductor 10A and second conductor 10B, are mounted on welding jigs. FIG. 11 illustrates a process of connecting surfaces of the first conductor 10A and the second conductor 10B by resistance welding. FIG. 12 illustrates a state in which the connecting of the first and second conductors 10A and 10B is completed after a bur is removed from a different conductor connecting part 11 therebetween.

As shown in FIG. 10, when the connecting surface cs1 of the first conductor 10A and the connecting surface cs2 of the second conductor 10B are brought into contact with each other and a current is conducted thereto while the first and second conductors 10A and 10B are mounted on welding jigs j, a surface of the second conductor 10B near a connecting part between the first and second conductors 10A and 10B is melted, and in this case, as shown in FIG. 11, a bur b may be formed when these conductors are pressurized in a direction of contact, thus forming the different conductor connecting part 11 near the connecting surface cs.

As described above, the first conductor 10A has been processed to increase a conductor volume rate by a certain length, and the melt penetration path 4 has been formed to reduce a volume rate by a certain length from the connecting surface cs2 of the second conductor 10B.

Upset butt welding may be used as a welding method of connecting the first conductor 10A and the second conductor 10B shown in FIG. 11. The upset butt welding is a connecting method using Joule heat by the conduction of current as a direct heat source for heating a connecting part region and melting a material. Upset butt welding according to the present disclosure may include a conductive heating process through the supply of current and a pressurizing process of compressing a conductor when the melting of the conductor starts at a connecting interface.

According to the present disclosure, during the upset butt welding, welding temperature is lower than the melting point of the first conductor 10A and resistance welding is performed at temperature higher than the melting point of the second conductor 10B.

Here, the first conductor 10A is hardly melted but the second conductor 10B is sufficiently melted, and thus, a molten material of the second conductor 10B is required to easily penetrate the melt penetration path 4 on the connecting surface cs2 of the second conductor 10B. To this end, it is important to select a suitable welding temperature.

When the welding temperature is higher than the melting point of the second conductor 10B but the difference between the melting temperature and the melting point is not large, the viscosity of the molten material is extremely high and thus it is difficult for the molten material to flow into the melt penetration path. When the welding temperature is far higher than the melting point of the second conductor 10B, it is likely that the molten material is not maintained in the form of a bur near the connecting part but flows down and does not sufficiently penetrate the melt penetration path. In this regard, resistance welding is preferably performed at the welding temperature that is 5 to 15% higher than the melting point of the second conductor 10B.

As shown in FIG. 10, a length d1 of the first conductor 10A and a length d2 of the second conductor that are exposed in a direction of connecting may be different from each other (d1<d2) while the first conductor 10A and the second conductor 10B are mounted on welding jigs j.

When current is conducted by bringing the first and second conductors 10A and 10B into contact with each other by upset butt welding, the first conductor 10A with a high melting point is not melted, whereas when an exposed length d1 of the first conductor 10A is reduced, the second conductor 10B with a low melting point is melted and thus an exposed length d2 of the second conductor 10B is determined in consideration of the amount of the second conductor 10B to be melted for sufficient connecting.

Specifically, the exposed length d2 of the second conductor 10B may be set to be twice or more, and preferably, ten times or more the exposed length d1 of the first conductor 10A.

The second conductor 10B may be aluminum or an aluminum alloy, has a lower melting point than that of the first conductor 10A formed of a copper material, and an exposed length thereof on welding jigs is set to be greater than that of the first conductor 10A. Thus, the second conductor 10B may be sufficiently melted and uniformly connected to the different conductor connecting part 11 even when welded in the form of a circular compressed conductor.

In addition, as shown in FIG. 11, an aluminum melt m gradually penetrates the melt penetration path 4 on the second conductor 10B during upset butt welding, and as shown in FIG. 12, the inside of the melt penetration path 4 is filled with the aluminum melt m in a state in which upset butt welding is completed, thereby forming the different conductor connecting part 11.

Here, the “different conductor connecting part” indicates a region on which the first conductor 10A and the second conductor 10B are connected with respect to a connecting surface cs due to the recrystallization of the peripheries thereof or the like, and may be defined as a region indicated by a dotted line and including a volume rate increase region 11A of the first conductor 10A and a volume rate increase region 11B of the second conductor 10B with respect to the connecting surface cs.

As shown in FIG. 12, the length of the melt penetration path 4 on the second conductor 10B decreases due to the melting of the second conductor 10B during a welding process but the volume rate increase region 11B of the second conductor 10B may be set to be longer than the volume rate increase region 11A of the first conductor 10A of the different conductor connecting part 11.

In the different conductor connecting part 11, the volume rate increase region 11A of the first conductor 10A may be a region which is generated by resistance-welding the first conductor 10A of the same material as the volume rate increase region 11A, removing a bur b from a connecting part 11', and cutting the connecting part 11' and whose volume rate is increased by a certain length from the connecting surface cs1 as described above with reference to FIGS. 1 to 3, and the volume rate increase region 11B of the second conductor 10B may be a region whose volume rate is increased due to the introduction of the aluminum melt m toward the second conductor 10B from the connecting surface cs2 of the second conductor 10B during the connecting with the first conductor 10A. Here, the volume rate increase region 11B of the second conductor 10B is formed to increase bending strength of the connecting part. As shown in FIGS. 10 to 12, it is described above that the volume rate increase region 11B of the second conductor 10B is formed by forming the melt penetration path 4 on the second conductor 10B but the present disclosure is not limited thereto.

In the volume rate increase region 11B of the second conductor 10B of the different conductor connecting part 11, the volume rate of the second conductor 10B is preferably increased by about 90% or more, thereby increasing the bending strength of the different conductor connecting part 11.

That is, it can be understood that the aluminum melt m penetrating the melt penetration path 14 and cured functions as a frame connecting the connecting surface cs and the second conductor 10B and improves a conductor volume rate by a certain length toward the second conductor 10B from the connecting surface cs of the different conductor connecting part 11.

When the upset butt welding is completed, the different conductor connecting part 11 may be completed by removing the bur b on an outer circumferential surface thereof after the completion of connecting, as shown in FIG. 12. In order to prevent damage such as cracks or fractures to the different conductor connecting part 11 in a tensile bending test, it is preferable that a volume rate of the volume rate increase region 11B of the second conductor 10B be 98% or more and a minimum length thereof be 3 mm or more in various test conditions.

In an example based on FIGS. 10 to 12, in order to connect different types of conductors, a melt penetration path was formed only on the second conductor 10B with a low melting point, and a conductor volume rate of the second conductor 10B in the different conductor connecting part 11 was increased to cause the bending strength of the different conductor connecting part 11 to be greater than that of the second conductor 10B during the connecting of the different types of conductors.

However, a method of increasing a conductor volume rate by forming a melt penetration path is applicable to not only a second conductor volume rate with a low melting point but also a first conductor volume rate with a high melting point.

In other words, at least one melt penetration path may be formed on and inside the connecting surface cs1 of the first conductor 10A before the connecting of the first conductor 10A and the second conductor 10B, so that the conductor volume rate may be further increased by a certain length from the connecting surface cs1 of the first conductor 10A formed by cutting the connecting part 11' of FIG. 3 and connecting strength between the first and second conductors 10A and 10B may be increased.

Through the melt penetration path, a molten material of the second conductor 10B is introduced during the connecting of the first conductor 10A and the second conductor 10B, thereby further increasing a volume rate of the volume rate increase region 11A of the first conductor 10A.

As the molten material of the second conductor 10B penetrates between the first conductors 10A through the melt penetration path, the connecting strength between the first conductor 10A and the second conductor 10B at the connecting surface cs increases. That is, it can be seen that an aluminum melt cured after penetrating a melt penetration path of the first conductor 10A may not only function as a frame connecting the first conductor 10A and the second conductor 10B with respect to the connecting surface cs but also increase a conductor volume rate by a certain length from the connecting surface cs of the different conductor connecting part 11 in a direction toward the first conductor 10A.

Figure 13:
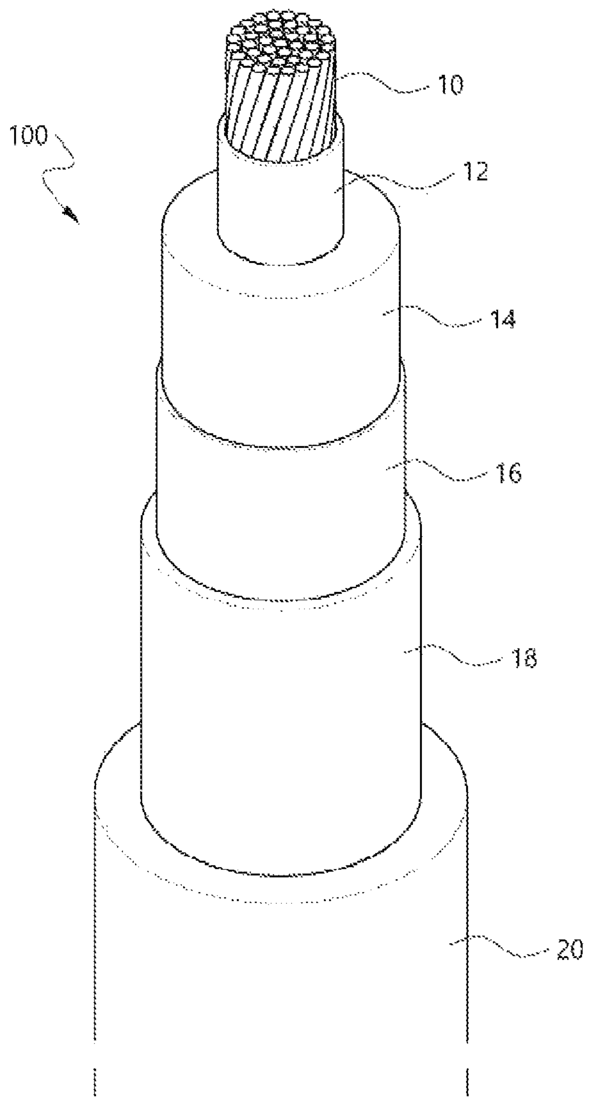
FIG. 13 is a cutaway perspective view of a power cable to which a conductor formed of copper or aluminum-based wires and compressed in a circular form and an XLPE insulating layer are applied.

FIG. 13 is a cutaway perspective view of a power cable to which a conductor formed of copper or aluminum-based wires and compressed in a circular form and an XLPE insulating layer are applied.

Figure 14:
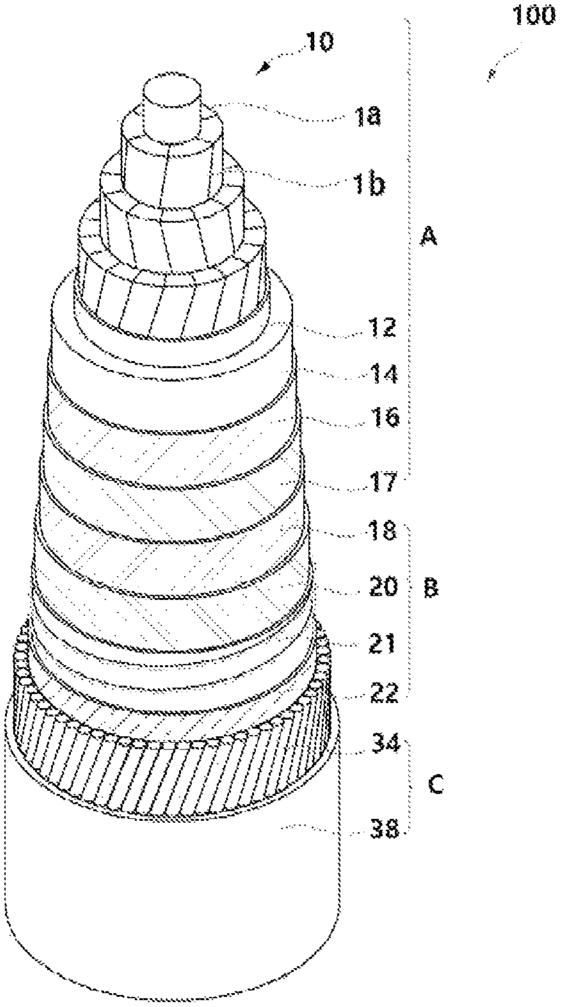
FIG. 14 is a cutaway perspective view of a power cable to which a copper or aluminum-based flat conductor and an XLPE insulating layer are applied.

Referring to FIG. 13, a power cable 100 includes a conductor 10 at a center thereof. The conductor 10 serves as a passage through which a current flows, and may be formed of, for example, copper (including a copper alloy) or aluminum (including an aluminum alloy). As shown in FIG. 14, the conductor 10 may be a circular compressed conductor formed by compressing a plurality of circular wires in a circular shape to achieve flexibility but may be a flat conductor as will be described with reference to FIG. 14 below.

Because a surface of the conductor 10 is not smooth, an electric field may not be uniform and a corona discharge is likely to partially occur. When an air gap is generated between the surface of the conductor 10 and an insulating layer 14 to be described below, insulation performance may decrease. To solve the above problem, an inner semiconducting layer 12 formed of a semiconductive material such as semiconductive carbon paper and the like may be provided outside the conductor 10.

The inner semiconducting layer 12 makes an electric field distribution uniform to achieve a uniform charge distribution on a surface of the conductor 10, thereby improving dielectric strength of the insulating layer 14 to be described below. Furthermore, the inner semiconducting layer 12 may prevent the formation of a gap between the conductor 10 and the insulating layer 14 to prevent a corona discharge and ionization.

The insulating layer 14 is provided on an outer side of the inner semiconducting layer 12. In general, a breakdown voltage of the insulating layer 14 should be high and insulation performance thereof should be stably maintained for a long time. Furthermore, the insulating layer 14 should have low dielectric loss and heat resistance performance such as heat resistance.

Generally, a paper-insulated material or a resin material (XLPE or the like) may be applied to the insulating layer 14 of the power cable 100.

An example in which an insulating layer of a power cable is formed of a resin material is illustrated in FIG. 13 but a paper-insulated insulating layer may be applied.

As a resin material of the insulating layer 14, polyolefin resin such as polyethylene and polypropylene, and preferably, polyethylene resin is used. The polyethylene resin may be a cross-linking resin, and a crosslinking agent may be silane or an organic peroxide, e.g., dicumyl peroxide (DCP).

An outer semiconducting layer 16 is provided outside the insulating layer 14. The outer semiconducting layer 16 is grounded to achieve an equipotential distribution of lines of electric force between the outer semiconducting layer 16 and the inner semiconducting layer 12, thereby improving the dielectric strength of the insulating layer 14. In addition, the outer semiconducting layer 16 may make a surface of the insulating layer 14 of the power cable smooth to mitigate the concentration of an electric field, thereby preventing a corona discharge.

A metal sheath 18 and the like may be provided outside the outer semiconducting layer 16 according to the type of the cable. The metal sheath 18 may be used for electrical shielding and as return of a short-circuit current and be replaced with a shielding layer that is in the form of neutral wire.

An outer jacket 20 is provided at am outermost side of the power cable 100. The outer jacket may be provided at the outermost side of the power cable 100 to protect the inner components of the power cable 100. Therefore, generally, the outer jacket 20 may be formed of polyvinyl chloride (PVC) or polyethylene (PE).

The power cable 100 may be a power cable laid under the ground or in an underground wiring pipe. The power cable may be a power cable (hereinafter referred to as a "submarine power cable") installed under water, such as a river or sea, as well as under the ground or in the underground wiring pipe. The submarine power cable may have a structure different from that of an underground power cable to be applied to a rough underwater environment and to protect the cable.

FIG. 14 is a cutaway perspective view of a power cable to which a copper or aluminum-based flat conductor and an XLPE insulating layer are applied. The power cable of FIG. 14 is substantially the same as the underground power cable described above with reference to FIG. 13 in terms of a structure and thus will be described focusing on differences with the underground power cable.

Referring to FIG. 14, a power cable 100 includes a cable core part A including a conductor 10, an inner semiconducting layer 12, an insulating layer 14, and an outer semiconducting layer 16, and transmits power along the conductor 10 only in a longitudinal direction of the power cable 100 and prevents leakage of current in a radial direction of the power cable 100.

The conductor 10 may act as a passage through which current flows to transmit power, and be formed of a material, e.g., copper (including a copper alloy) or aluminum (including an aluminum alloy), which has high conductivity to minimize power loss and has strength and flexibility appropriate to manufacture and use a cable.

As shown in FIG. 11, the conductor 10 may be a flat conductor 10 with a flat wire layer 1C including a circular central wire 1*a* and flat stranded wires 1*b* that surround the circular central wire 1*a*, and has an overall circular cross section.

As another example, as shown in FIG. 13, the conductor 10 may be a circular compressed conductor formed by compressing a plurality of circular stranded wires in a circular shape.

A volume rate of the flat conductor 10 is higher than that of the circular compressed conductor shown in FIG. 13, thus contributing to a reduction of an outer diameter of a cable.

An inner semiconducting layer 12 may be provided outside the conductor 10, and an insulating layer 14 may be provided outside the inner semiconducting layer 12. The insulating layer 14 may be formed of a paper-insulated material or a resin material but an example in which the power cable 100 of FIG. 14, which is a submarine power cable, is formed of an XLPE material similar to the underground power cable shown in FIG. 13 is illustrated in FIG. 14.

An outer semiconducting layer 16 may be provided outside the insulating layer 14, and a moisture absorbing part 17 may be provided outside the outer semiconducting layer 16 to prevent the penetration of moisture into the cable. The moisture absorbing part 17 may be formed between the stranded wires of the conductor 10 and/or outside the conductor 10, and be in the form of powder, a tape, a coating layer, or a film containing a super absorbent polymer (SAP) capable of quickly absorbing moisture penetrating a cable and maintaining a state of absorbing the moisture, thereby preventing the penetration of moisture in the longitudinal direction of the cable. The moisture absorbing 17 part 21 may have semiconductivity to prevent a sudden change in an electric field.

The moisture absorbing part 17 may be provided together with a nonwoven copper wire tape (not shown). The nonwoven copper wire tape includes copper wire, a nonwoven tape, and the like to facilitate electrical contact between the outer semiconducting layer 16 and the metal sheath 18. The moisture absorbing layer 17 is provided in the form of powder, a tape, a coating layer, a film or the like containing an SAP capable of quickly absorbing moisture penetrating the power cable 100 and maintaining a state of absorbing the moisture to prevent the penetration of moisture in the longitudinal direction of the power cable 100. The nonwoven copper wire tape and the moisture absorbing layer 17 may preferably have semiconductive properties to prevent a sudden change in an electric field, and the moisture absorbing layer 17 may include copper wire to conduct electric current and absorb moisture.

A cable protection part B is provided outside the cable core part A configured as described above, and the power cable 100 to be laid at the sea bottom may further include a cable armor C. The cable protection part B and the cable armor C protect the cable core part A from various environmental factors, such as moisture penetration, mechanical trauma, and corrosion, which may affect power transmission performance of the cable.

The cable protection part B includes a metal sheath 18 and a polymer sheath 20 to protect the cable from fault current, an external force, and other external environmental factors.

It is described that the underground power cable shown in FIG. 13 has a structure in which the cable jacket is provided outside the metal sheath, whereas it may be understood that the polymer sheath 20 is provided outside the metal sheath 18 of the submarine power cable shown in FIG. 14.

In particular, the metal sheath 18 of the submarine power cable may be formed to surround the core part 10 for the purpose of shielding, grounding, or sealing. In particular, when the power cable 100 is laid in an environment such as the sea bottom, the cable core part A may be sealed to prevent the penetration of foreign substances such as moisture thereinto, and a molten metal may be extruded on the outside of the cable core part A to make the cable core part A have seamless and continuous outer sides, thereby enhancing watertightness performance. The molten metal may be lead or aluminum, preferably, lead having excellent corrosion resistance to seawater when the power cable 100 is laid at the sea bottom, and more preferably, a lead alloy containing a metal element to reinforce mechanical properties. The metal sheath 18 may be grounded at an end of the power cable 100 to function as a passage through which fault current flows when an accident such as a ground fault or a short circuit occurs, protect the power cable 100 from external shocks, and prevent an electric field from being discharged to the outside of the power cable 100.

An anticorrosion compound, e.g., blown asphalt, may be applied onto a surface of the metal sheath 18 to additionally improve corrosion resistance, watertightness, etc. of the power cable 100 and improve adhesion to the polymer sheath 20.

The polymer sheath 20 may be formed outside the metal sheath 18 to improve corrosion resistance, watertightness, etc. of the power cable 100 and protect the power cable 100 from other external environmental factors such as mechanical trauma, heat, and ultraviolet rays. The polymer sheath 20 may be formed of a resin such as polyvinyl chloride (PVC) or polyethylene, and preferably, polyethylene resin having excellent watertightness when the power cable 100 is laid at the sea bottom and preferably, polyvinyl chloride (PVC) resin in an environment requiring flame retardancy.

The power cable 100 may include a metal strip layer 21 outside the polymer sheath 20 in the form of a galvanized steel tape or the like to prevent the expansion of the metal sheath 18 due to the expansion of the insulating oil. A bedding layer (not shown) formed of a semiconductive non-woven tape or the like may be provided on and/or below the metal strip layer 21 to buffer an external force applied to the power cable 100, and an outer sheath 22 formed of a resin such as polyvinyl chloride or polyethylene may further be provided as the cable protection part B to significantly improve corrosion resistance, watertightness, etc. of the power cable 100 and additionally protect the power cable 100 from other external environmental factors such as mechanical trauma, heat, ultraviolet rays, etc.

The power cable 100, when laid at the sea bottom, is likely to be damaged by the anchor of a ship, a bending force due to sea currents or waves, friction with the sea bottom, etc., and thus may further include the cable armor C outside the cable protection part B to prevent this problem.

The cable armor C may include a metal armor layer 34 and a serving layer 38. The metal armor layer 34 may be formed of steel, galvanized steel, copper, brass, bronze, or the like, be formed in at least one layer by cross-winding wire having a round or flat cross section, enhance mechanical properties and performance of the power cable 100, and additionally protect the power cable 100 from an external force.

The serving layer 38 formed of polypropylene yarn or the like may be provided in one or more layers on and/or below the metal armor layer 34 to protect the power cable 100. The serving layer 38, which is an outermost layer, may be formed of two or more materials of different colors to secure visibility of the power cable 100 laid at the sea bottom.

When such a power cable is laid, an intermediate connection may be performed at intervals of several hundred meters or several kilometers.

Figure 15:
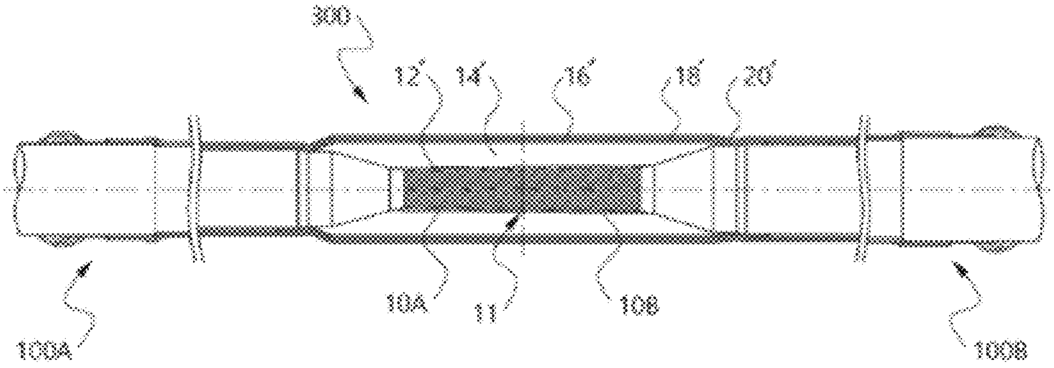
FIG. 15 is a cross-sectional view of an intermediate connection structure of a power cable according to an embodiment of the present disclosure.

FIG. 15 is a cross-sectional view of an intermediate connection structure of a power cable according to an embodiment of the present disclosure.

The intermediate connection structure of FIG. 15 may be a factory connection structure or a flexible connection structure generally used for a submarine power cable and the like.

That is, an intermediate connection of power cables 100A and 100B may be performed in a power cable factory instead of a power cable installation site, and the power cables 100A and 100B may be laid by being transferred to an installation site while being wound around a bobbin, a turntable, or the like, thereby reducing a power cable installation period and costs.

Conductors of a pair of power cables connected through an intermediate connection structure 300 may be different types of conductors.

For example, a first conductor 10A of the first power cable 100A may be a copper conductor, and a second conductor 10B of the second power cable 100B may be an aluminum conductor.

For such a factory connection structure, an enclosure such as a housing is not applied, and an intermediate connection structure may be configured through a restoration layer restored similar to internal structures of the power cables.

That is, a different conductor connecting part may be formed by performing upset butt welding on a connecting surface in a state in which a volume rate of the first conductor 10A is increased and a volume rate of the second conductor 10B is reduced as described above. An inner semiconducting restoration layer 12' may be formed outside a conductor connecting part 11 by using a semiconductive tube. An insulating restoration layer 14' restored from an insulating layer may be formed by winding an XLPE tape or insulating paper around an outside of the inner semiconducting restoration layer 12' to connect insulating layers of both the power cables to each other. An outer semiconducting restoration layer 16' may be formed outside the insulating restoration layer 14' by using a semiconducting tube, similar to the inner semiconducting restoration layer 12'.

For connection of metal sheaths of the power cables and a shielding, waterproofing or sealing purpose, a metal strip restoration layer 18' may be formed using a lead tube or the like, an outer sheath restoration layer 20' may be restored outside the metal strip restoration layer 18', and a metal strip restoration layer, an outer cover restoration layer, and the like may further be formed when necessary.

When such a factory connection structure is installed in an underwater environment such as the sea bottom, the factory connection structure is continuously exposed to a bending force and a tensile force is continuously applied thereto due to the influence of tidal currents or the like, and thus, sufficient bending strength should be secured for a conductor connecting part of the intermediate connection structure.

Thus, as described above, a volume rate of the first conductor 10A, which is formed of copper, of the first power cable may be increased by a certain length and a volume rate of the second conductor 10B, which is formed of aluminum, of the second power cable may be reduced by a certain length, so that during upset butt welding, a molten material with a lower melting point than that of the first conductor 10A may be introduced into the melt penetration path on the connecting surface of the second conductor 10B to fill an empty space in the second conductor 10B, thereby increasing the volume rate of the second conductor 10B and improving bending strength.

The different conductor connecting part shown in FIGS. 1 to 15 will be described, for example, with respect to a case in which conductors of both power cables are different types but the diameters of the conductors are the same. Because the diameters of the conductors are the same, although the power cable with the first conductor 10A, which is a copper conductor, generates less heat and has a high power transmission capacity, the generation of heat is not a critical problem in submarine sections in the case of cables connecting a land section and a submarine section. Thus, when a power cable with an aluminum copper is laid on a submarine section, a power cable with a copper conductor is laid on a land section, and intermediate connection is performed at a boundary area, both a reduction of costs and an improvement of stability can be achieved.

However, in addition to such special boundary areas, there are cases in which it is necessary to interconnect two power cables having a pair of different types of conductors. In this case, power cables including conductors with different diameters and thus having different diameters are interconnected due to different current carrying capabilities or different amounts of heat.

Specifically, the first conductor 10A, which is a copper conductor, and the second conductor 10B, which is an aluminum conductor, may be configured to have different diameters according to a current carrying capability or heat generation.

Figure 16:
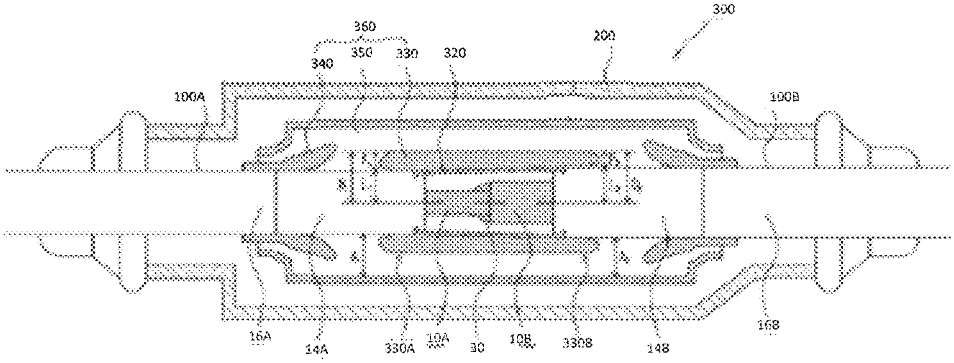
FIG. 16 is a cross-sectional view of an intermediate connection structure of a power cable according to an embodiment of the present disclosure.
Figure 17:
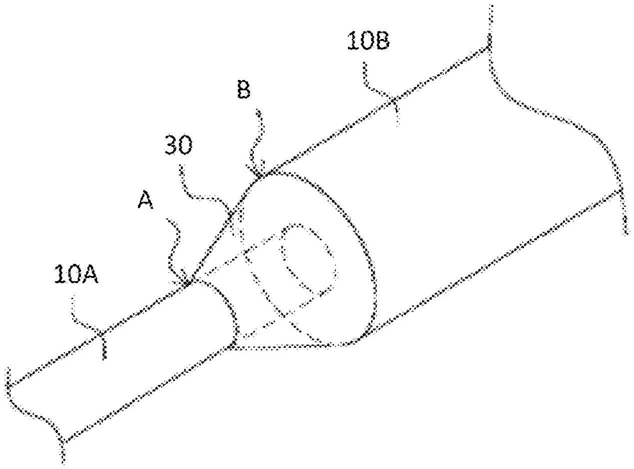
FIG. 17 is a perspective view of a different conductor connecting part applicable to the intermediate connection structure of the power cable of FIG. 16.

The present disclosure provides a different conductor connecting part applicable to the first conductor 10A and the second conductor 10B having different diameters (different types of conductors with different diameters). Referring to FIGS. 16 and 17, a connection structure of different types of conductors having different diameters, and an intermediate connection structure of power cables including these conductors.

FIG. 16 is a cross-sectional view of an intermediate connection structure of a power cable according to an embodiment of the present disclosure. FIG. 17 is a perspective view of a different conductor connecting part applicable to the intermediate connection structure of the power cable of FIG. 16.

Referring to FIG. 16, an intermediate connection structure 300 may include a first conductor 10A and a second conductor 10B of a pair of a first power cable 100A and a second power cable 100B, an O-ring 30 bonded on ends of the first conductor 10A and the second conductor 10B, a corona shield 320 coupled to insulating layers 14A and 14B of the pair of the first power cable 100A and the second power cable 100B to surround the different conductor connecting part, and a sleeve member 360 that surrounds outer sides of the pair of the first power cable 100A and the second power cable 100B, is formed of an elastic resin that contracts at room temperature, and is in a premolded joint (PMJ) form. The sleeve member 360 may have a hollow shape.

The corona shield 320 extends from the insulating layer 14A of the first power cable 100A toward the insulating layer 14B of the second power cable 100B. In this case, the corona shield 320 may have a flat outer surface, is configured to surround the O-ring 30, form a continuous surface without a step difference between the surfaces of the pair of insulating layers 14*a* and 14*b* facing each other to prevent or mitigate an electric field concentration, and prevent a corona discharge that may occur between the pair of first conductors 10A and 10B, and the sleeve member 360 that are connected by the O-ring 30.

According to an embodiment of the present disclosure, because a pair of cables 100A and 100B having different diameters are connected to each other, the corona shield 320 has a structure in which the diameters of opposite sides are different from each other, and an outer side is inclined toward the first power cable 100A with a relatively small diameter from the second power cable 100B with a relatively large diameter.

The sleeve member 360 may include: a first electrode 330 including a first end 330A, which is provided outside the corona shield 320, formed of copper, and into which an end of the first power cable 100A with a conductor having a relatively small diameter is inserted, and a second end 330B, which is formed of aluminum and into which an end of the second power cable 100B with a conductor having a relatively large diameter is inserted; a pair of second electrodes 340 located opposite to the first electrode 330 to be spaced apart from the first electrodel 330; and a sleeve insulating layer 350 surrounding the first electrode 330, the second electrode 340, and the insulating layers 14A and 14B of the pair of the first power cable 100A and the second power cable 100B. The sleeve insulating layer 350 may be formed of ethylene propylene diene monomer (EPDM) or liquid silicon rubber (LSR).

The first electrode 330 is formed of a semiconductive material and is electrically connected to the first conductor 10A and the second conductor 10B of the power cables 100A and 100B, thus serving as a so-called high-voltage electrode. Similarly, the second electrode 340 is formed of a semiconductive material and is connected to the outer semiconducting layers 16*a* and 16*b* of the power cables 100A and 100B, thus serving as a so-called deflector. Therefore, an electric field in the intermediate connection structure 300 is distributed between the first electrode 330 and the second electrode 340, and the first electrode 330 and the second electrode 340 cause the electric field to be evenly dispersed therebetween without being locally concentrated.

In this case, the first electrode 330 may be configured such that a distance D1 from a center of the cable on which the first end 330A is located to an outer surface and a distance D2 from a center of the second end 330B to the outer surface are the same, and a distance L1 from the center of the first end 330A to an inner surface and a distance L2 from the center of the second end 330B to the inner surface and distances P1 and P2 from surfaces of the insulating layers 14A and 14B and surfaces of the first power cable 100A and the second power cable 100B to the outer surface may be different from each other.

The first conductor 10A and the second conductor 10B are different from each other in terms of a material and a diameter and thus the distances from the outer circumferential surfaces of the insulating layers 14A and 14B of the first power cable 100A and the second power cable 100B to the centers of the first and second power cables 100A and 100B are different from each other. However, the distance D1 from the center of the cable corresponding to the position of the first end 330A to the outer surface and the distance D2 from the center of the second end 330B to the outer surface may be equalized due to the first electrode 330 by setting the distances L1 and L2 from the centers of the first end 330A and the second end 330B to the inner surface and the distances P and P2 from the surfaces of the insulating layers 14A and 14B of the first power cable 100A and the second power cable 100B to the outer surface to be different from each other.

Furthermore, the intermediate connection structure 300 includes an enclosure member 200 including a so-called "coffin box" or a "metal casing" surrounding the sleeve member 360. In this case, a space between the housing 200 and the sleeve member 360 may be filled with a waterproof material (not shown) or the like.

Even when diameters of conductors to be connected or outer diameters of power cables to be connected are different from each other as described above, an electric field concentration near a conductor connecting part may be mitigated using the O-ring 30. similarly, in the above case, a volume rate may be increased by a certain length from a connecting surface of the first conductor 10A, which is formed of copper, of the first power cable, and a volume rate may be reduced by a certain length from a connecting surface of the second conductor 10B, which is formed of aluminum, of the second power cable, so that during upset butt welding, a molten material of the second conductor 10B may be introduced into a melt penetration path on the connecting surface of the second conductor 10B to fill an empty space in the second conductor 10B, thereby increasing a volume rate of the second conductor 10B and improving bending strength.

FIG. 16 illustrates an intermediate connection structure for connecting power cables, each including an insulating layer formed of an XLPE material, as an example of a pair of power cables having different types of conductors with different diameters. However, power cables whose conductors are connected to a different conductor connecting part according to the present disclosure may be paper-insulated cables.

That is, referring to FIGS. 1 to 16, a different conductor connecting part and a method of connecting different types of conductors according to the present disclosure are applicable to connecting conductors with the same diameter and connecting conductors which have different diameters and to which an O-ring is bonded, and are also applicable to an intermediate connection structure with a reinforcing insulating layer formed by winding insulating paper around the outside of the different conductor connecting part to be connected to paper-insulated layers of opposite paper-insulated power cables, as well as an intermediate connection structure in which a corona shield and a sleeve member are mounted outside a different conductor connecting part according to the types of insulating layers of power cables to be intermediately connected. Such a paper-insulated intermediate connection structure is applicable to a rigid joint including an enclosure method or a flexible factory or flexible connection structure in which an enclosure member is omitted and each cable layer is restored outside a reinforcing insulating layer.

As described above, for intermediate connection of power cables including different types of conductors, such as a copper conductor and an aluminum conductor, conductors and cables may be formed to have different diameters to solve problems caused by a current carrying capacity or heat generation. An intermediate connection method of a pair of power cables having different diameters and including different types of conductors will be described below.

An order of connecting a pair of a first power cable 100A and a second power cable 100B including conductors with different diameters through an intermediate connection structure 300, and the intermediate connection structure 300 will be described in detail below with reference to drawings.

Referring to FIG. 17, an O-ring 30 may be provided to surround a different conductor connecting part 11 to bond different types of conductors with different diameters.

The first conductor 10A is inserted and mounted in the O-ring 30, and a maximum outer diameter of the O-ring 30 may be equal to the outer diameter of the second conductor 10B and a minimum outer diameter (through-hole diameter) thereof may be equal to the outer diameter of the first conductor 10A.

Therefore, when upset butt welding is completed while the O-ring 30 is mounted, a side of a maximum outer diameter portion B of the O-ring 30 may be bonded on the connecting surface cs2 of the second conductor 10B and an inner circumferential surface of a through hole of the O-ring 30 may be bonded on an outer circumferential surface of the first conductor 10A.

Therefore, a diameter of the through hole of the O-ring 30 preferably corresponds to the diameter of the first conductor 10A.

Due to the above structure, connecting surfaces of the first conductor 10A and the second conductor 10B, which are different types of conductors with different diameters, may be connected with each other, and an inner circumferential surface of the through hole of the O-ring 30 and a connecting surface thereof may be respectively bonded on the outer circumferential surface of the first conductor 10A and the connecting surface cs2 of the second conductor 10B, thereby unifying the first conductor 10A and the second conductor 10B.

The O-ring 30 may be provided to compensate for the difference in diameter between the second conductor 10B of the second power cable 100B and the first conductor 10A of the first power cable and remove a step difference in the different conductor connecting part 11. Therefore, a cross section of the O-ring 30 may have a right triangle shape or a tapered shape. The O-ring 30 may have a tapered outer circumferential surface to remove a step difference between the first conductor 10A and the second conductor 10B in the different conductor connecting part 11 and prevent or alleviate electric field concentration at a step or the like.

The O-ring 30 may be formed of the same material as the first conductor 10A or the second conductor 10B, and preferably, the same material as the second conductor 10B with a low melting point.

Figure 18:
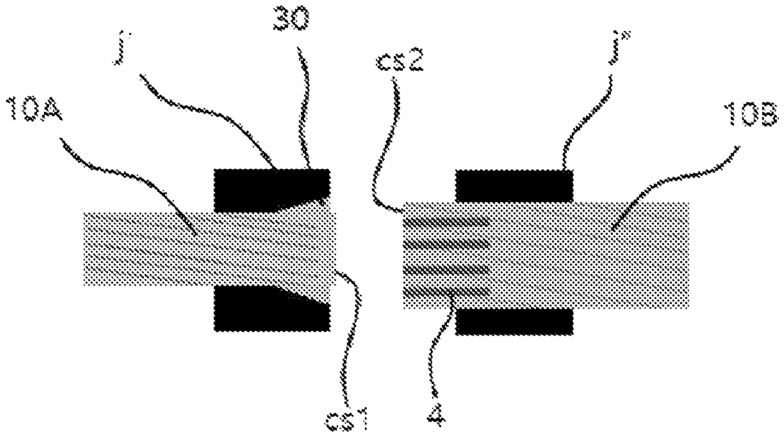
FIGS. 18 to 20 illustrate a process of connecting conductors by a different conductor connecting part of FIG. 17.
Figure 19:
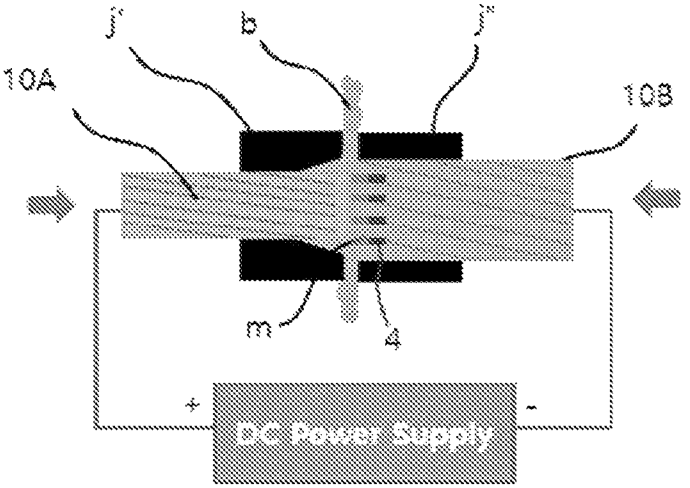
Figure 20:
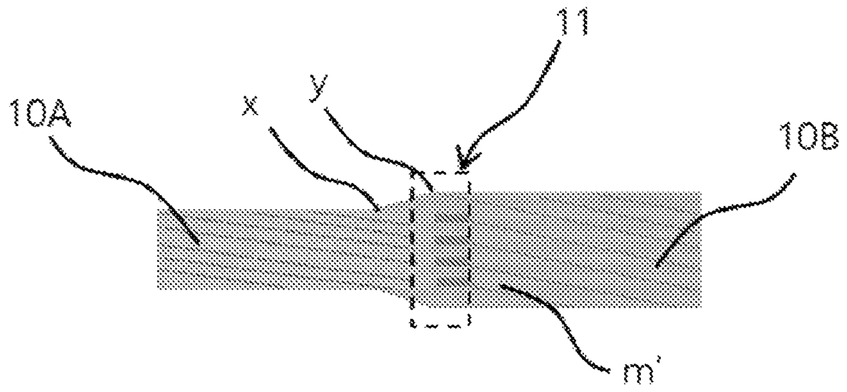

FIGS. 18 to 20 illustrate a process of connecting conductors by a different conductor connecting part of FIG. 17.

The process of connecting conductors by a different conductor connecting part of FIGS. 18 to 20 is the same as the process of connecting different types of conductors with the same diameter described above with reference to FIGS. 1 to 12, except that the O-ring 30 is applied to alleviate an electric field concentration in the different conductor connecting part 11.

That is, the process of FIGS. 18 to 20 is different from the process of FIGS. 1 to 12 in that when the diameters of conductors to be connected or the outer diameters of power cables to be connected are different from each other, an electric field concentration near the different conductor connecting part 11 is alleviated using the O-ring 30 but is the same as the process of FIGS. 1 to 12 in that before the connecting of the first conductor 10A and the second conductor 10B, a volume rate is increased by a certain length from the connecting surface cs1 of the first conductor 10A, which is a copper conductor, of the first power cable as shown in FIGS. 1 to 6 and a volume rate is reduced by forming a melt penetration path by a certain length on the connecting surface cs2 of the second conductor 10B, which is an aluminum conductor, of the second power cable as shown in FIGS. 7 to 10, so that during upset butt welding, a molten material of the second conductor 10B with a melting point lower than that of the first conductor 10A may be introduced into the melt penetration path on the connecting surface cs2 of the second conductor 10B to fill an empty space in the second conductor 10B, thereby increasing the volume rate of the second conductor 10B and improving bending strength.

Accordingly, a description on parts of the process of FIGS. 18 to 20 that are the same as those of the process of connecting connecting different types of conductors with the same diameter described above with reference to FIGS. 1 to 12 will be omitted here.

As shown in FIG. 18, when a first conductor 10A and a second conductor 10B with different diameters are respectively mounted on welding jigs j' and j", an O-ring 30 may be mounted on an end of the first conductor 10A. Accordingly, the welding jigs j' shown in FIG. 18 may be configured to have a structure including an O-ring accommodation part to mount thereon the first conductor 10A on which the O-ring 30 is mounted.

The O-ring 30 may be formed of an aluminum-based material similar to the second conductor 10B with a low melting point to be melted and recrystallized together with the first conductor 10A and the second conductor 10B when a current is supplied and pressure is applied. Although the O-ring 30 may be formed of a copper-based metal similar to the first conductor 10A, the O-ring 30 is preferably formed of the material of the second conductor 10B with the low melting point to improve adhesion among the O-ring 30, the inner circumferential surface of the through hole of the O-ring 30, and the first conductor 10A inserted into the through hole.

The connecting of the different conductor connecting part 11 including the first conductor 10A, the second conductor 10B, and the O-ring 30 by the above method may be completed by inserting an end of the first conductor 10A into the second conductor 10B as shown FIG. 20, and thus, an inclined surface may be achieved rather than a step regardless of the different diameters of the conductors 10A and 10B due to the replacement of the outer circumferential surface of the different conductor connecting part 11 with the outer circumferential surface of the O-ring 30.

As described above, an outer diameter at a minimum outer diameter point x on the outer circumferential surface of the O-ring 30 may be equal to that of the first conductor 10A and an outer diameter at a maximum outer diameter point y thereon may be equal to that of the second conductor 10B, and thus, a gentle inclined surface may be achieved instead of a step in the different conductor connecting part 11, which may be caused by the difference in diameter between the first conductor 10A and the second conductor 10B, thereby alleviating problems such as electric field concentration. Similarly, during upset butt welding, an aluminum melt may be introduced into the melt penetration path on the connecting surface of the second conductor 10B, thereby improving a volume rate and bending strength of the second conductor 10B.

In addition, the O-ring 30 is recrystallized during upset butt welding, surrounds the vicinity of a connecting part of the first conductor, and is connected to the aluminum conductor in the melt penetration path serving as a frame in the second conductor through the connecting surface, thereby further improving tensile bending strength.

Figure 21:
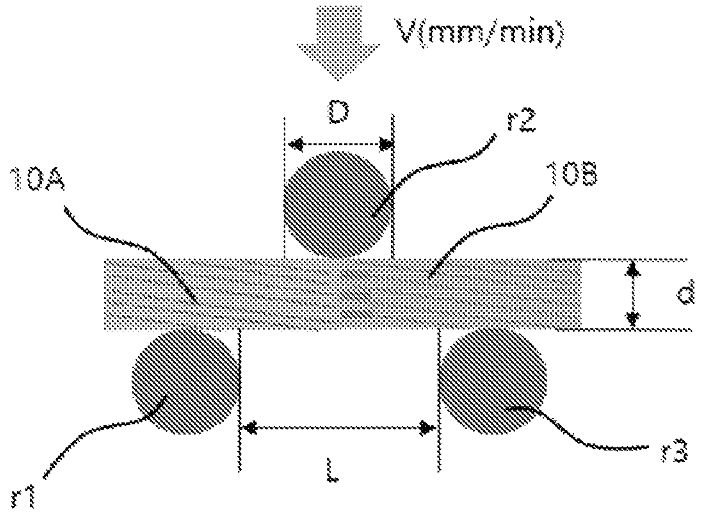
FIG. 21 illustrates a 3-point bending test, which is a test method of checking bending strength.
Figure 22:
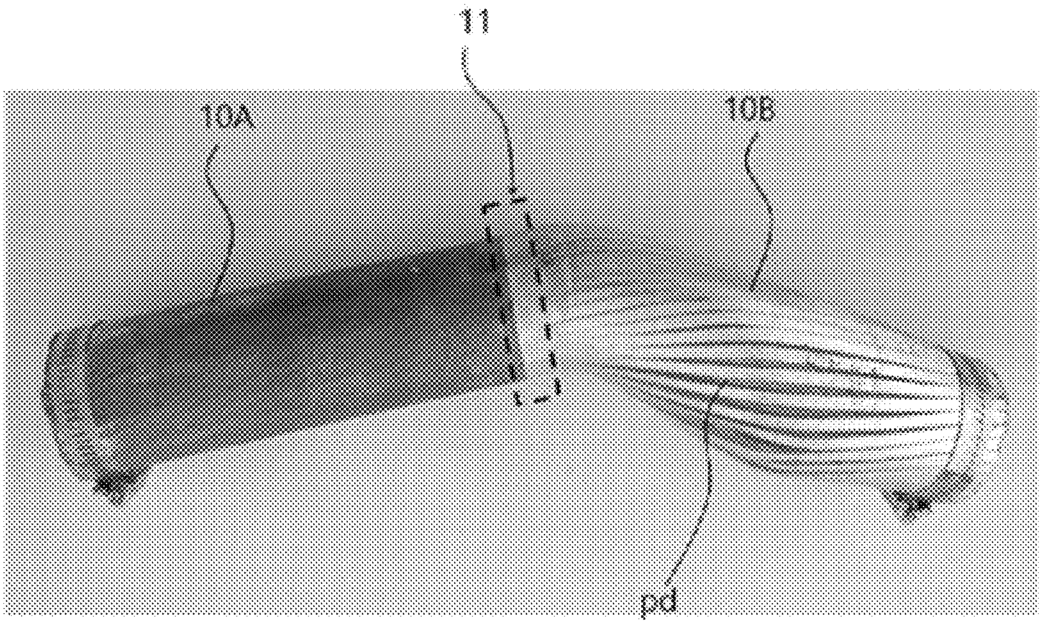
FIG. 22 is an image of a result of the 3-point bending test conducted on a different conductor connecting part connected by a method of connecting different types of conductors according to the present disclosure.
Figure 23:
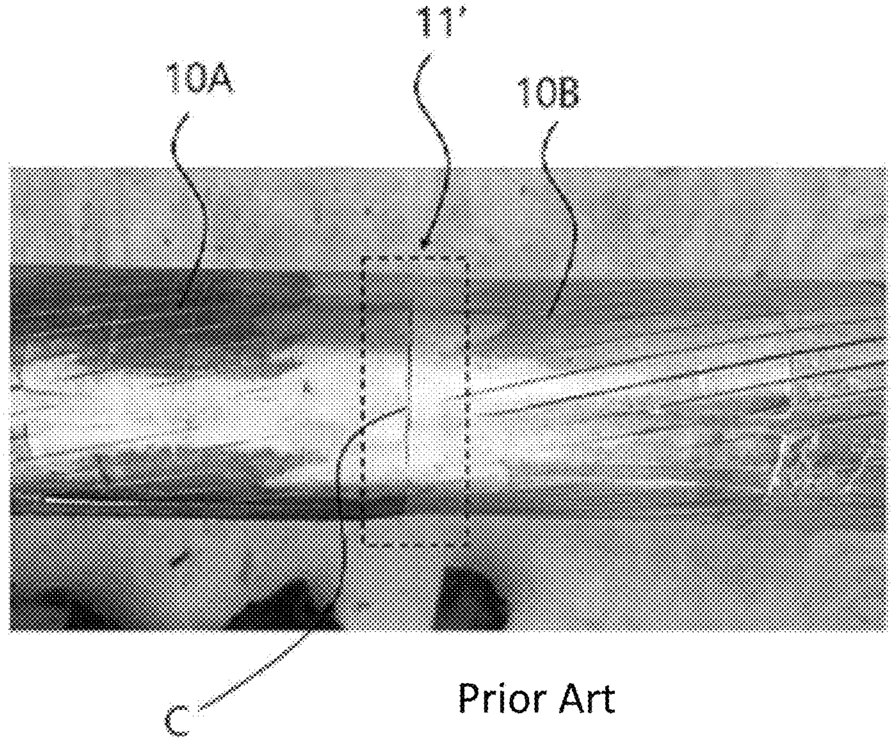
FIG. 23 illustrates an example in which a crack occurs at a connecting part between different types of conductors connected by a technique related to Korea Laid-Open Patent Application No. 10-2020-0069967.
Figure 24:
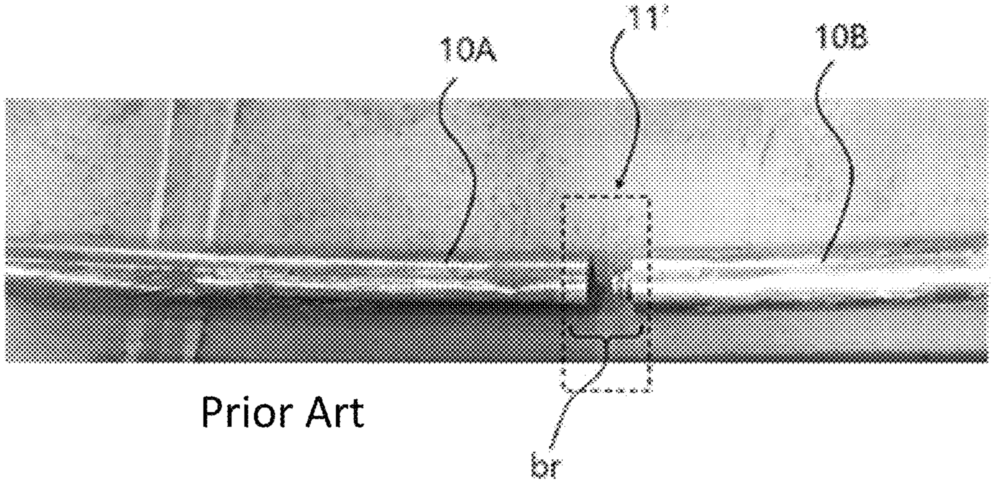
FIG. 24 illustrates an example in which a crack occurs at a connecting part between different types of conductors connected by a technique related to Korea Laid-Open Patent Application No. 10-2020-0069969.

FIG. 21 illustrates a 3-point bending test, which is a test method of checking bending strength. FIG. 22 is an image of a result of the 3-point bending test conducted on a different conductor connecting part connected by a method of connecting different types of conductors according to the present disclosure.

In the 3-point bending test shown in FIG. 21, a sample is placed on a first roller r1 and a third roller r3, a second roller r2 is located in contact with the sample, load is recorded at certain time intervals while the second roller r2 is moved downward, and the test is stopped when the sample is broken or applied load exceeds a maximum level to test bending strength at a point pressurized by the second roller r2.

For example, according to the test conditions of the ISO 7438 Metallic materials bend test, a distance L between the first and third rollers r1 and r3 is 240 mm, a diameter D of the second roller r2 is 100 mm, an average sample diameter d is 48 mm, a falling speed V of the second roller r2 may be 10 mm/min, and the test conditions can be changed within an appropriate range.

Specifically, the sample shown in FIG. 22 is a test result obtained by conducting the 3-point bending test. Samples may include the different conductor connecting part 11, the first conductor 10A that is a copper conductor, and the second conductor 10B that is an aluminum conductor. Preprocessing is performed on the first conductor 10A to increase a volume rate by a certain length from a connecting surface. Preprocessing is performed on the second conductor 10B to reduce a volume rate by forming a melt penetration path as shown in FIG. 10 on a connecting surface. The different conductor connecting part 11 is a connecting part structure of the first conductor 10A and the second conductor 10B, in which the volume rates of the first conductor 10A and the second conductor 10B are increased.

As shown in FIG. 22, a result of conducting the 3-point bending test revealed that wire separation, which is an example of deformation pd, occurred in the second conductor 10B with a relatively low melting point before damage, e.g., deformation, fractures, and cracks, occurred in the first conductor 10A, which is a copper conductor, and the different conductor connecting part 11. The deformation occurring in the second conductor 10B to which a load lower than that applied to the different conductor connecting part 11 was applied indicates that the bending strength of the different conductor connecting part 11 is higher than that of the second conductor 10B.

In general, a conductor is designed to exhibit sufficient bending strength in a harsh environment such as a submarine environment and thus it can be seen that the different conductor connecting part 11 ensures sufficient bending strength when the bending strength of the different conductor connecting part 11 is higher than that of the second conductor 10B.

The test result reveals that the bending strength of the different conductor connecting part 11 was higher than that of the second conductor 10B, when the first conductor 10A, which was processed to increase a conductor volume rate by a certain length from the connecting surface cs1, and the second conductor 10B, which was processed to reduce a volume rate by a certain length from the connecting surface cs2 and has a melting point lower than that of the first conductor 10A, were connected by upset butt welding at temperature lower than the melting point of the first conductor 10A and higher than the melting point of the second conductor 10B. It can be seen that the bending strength of the different conductor connecting part 11 is lower than that of the first conductor 10A according to the materials thereof.

Therefore, when power cables with different types of conductors are connected, damage such as deformation, fractures, and cracks that may occur in the different conductor connecting part can be prevented by forming the volume rate increase region 11A of the first conductor 10A and the volume rate increase region 11B of the second conductor 10B with respect to the connecting surface cs of the different conductor connecting part.

While the present disclosure has been described above with respect to exemplary embodiments thereof, it would be understood by those of ordinary skilled in the art that various changes and modifications may be made without departing from the technical conception and scope of the present disclosure defined in the following claims. Thus, it is clear that all modifications are included in the technical scope of the present disclosure as long as they include the components as claimed in the claims of the present disclosure.

The invention claimed is:

1. A power cable system, which includes a first power cable with a first conductor, a second power cable with a second conductor, and a cable connection structure for connecting the first power cable and the second power cable, wherein the first conductor of the first power cable comprises a plurality of wires, the second conductor of the second power cable comprises a plurality of wires and is formed of a material different from a material of the first conductor, a melting point of the first conductor is higher than that of the second conductor, the cable connection structure comprises a different conductor connecting part formed by connecting the first conductor and the second conductor, the different conductor connecting part comprises a volume rate increase region of the first conductor and a volume rate increase region of the second conductor, and is formed by forming the volume rate increase region of the first conductor by preprocessing the first conductor to increase a volume rate by a certain length from a connecting surface (cs1) of the first conductor, forming the volume rate increase region of the second conductor by preprocessing the second conductor to reduce a volume rate by a certain length from a connecting surface (cs2) of the second conductor, and connecting the first conductor and the second conductor by resistance welding, wherein the preprocessing of the second conductor comprises forming a melt penetration path to extend from the connecting surface (cs2) in a longitudinal direction of the second conductor before the connecting of the first conductor and the second conductor.

2. The power cable system of claim 1, wherein the preprocessing of the first conductor comprises connecting a pair of first conductors by welding and cutting a connecting part between the pair of first conductors to obtain a cut surface as the connecting surface (cs1) of the first conductor.

3. The power cable system of claim 2, wherein, due to the preprocessing of the first conductor, the volume rate increased by the certain length from the connecting surface (cs1) of the first conductor is 98% or more.

4. The power cable system of claim 1, wherein the first conductor is formed of copper or a copper alloy, and the second conductor is formed of aluminum or an aluminum alloy.

5. The power cable system of claim 1, wherein, due to the preprocessing of the second conductor, the volume rate reduced by the certain length from the connecting surface (cs2) of the second conductor is 90% or less.

6. The power cable system of claim 1, wherein the melt penetration path is formed by drilling multiple points on the connecting surface (cs2) of the second conductor by a drill.

7. The power cable system of claim 1, wherein the melt penetration path is formed by partially cutting and removing the plurality of wires of the second conductor from the connecting surface (cs2) of the second conductor by using a cutting tool.

8. The power cable system of claim 1, wherein a volume rate of the volume rate increase region of the second conductor is 98% or more in a range of at least 3 mm from the connecting surface (cs) in a longitudinal direction of the second conductor.

9. A power cable connection method of connecting a first power cable with a first conductor including a plurality of circular wires and a second power cable with a second conductor including a plurality of circular wires and formed of a material different from a material of the first conductor, the power cable connection method comprising:

preprocessing the first conductor by a certain length from a connecting surface (cs1) of the first conductor to increase a volume rate to a predetermined level or more;

preprocessing the second conductor by a certain length from a connecting surface (cs2) of the second conductor to reduce a volume rate to a predetermined level or more; and performing resistance welding to bond the connecting surface (cs1) of the first conductor and the connecting surface (cs2) of the second conductor to form a different conductor connecting part, wherein the preprocessing of the second conductor is performed by forming a melt penetration path to extend by a predetermined length from the connecting surface (cs2) of the second conductor before the connecting with the first conductor.

10. The power cable connection method of claim 9, wherein the melt penetration path is formed such that a volume rate of 90% or less of a certain length from the connecting surface (cs2) of the second conductor.

11. A power cable system, which includes a first power cable with a first conductor, a second power cable with a second conductor, and a cable connection structure for connecting the first power cable and the second power cable, wherein the first conductor of the first power cable comprises a plurality of wires, the second conductor of the second power cable comprises a plurality of wires and is formed of a material different from a material of the first conductor, a melting point of the first conductor is higher than that of the second conductor, the cable connection structure comprises a different conductor connecting part formed by connecting the first conductor and the second conductor, the different conductor connecting part comprises a volume rate increase region of the first conductor and a volume rate increase region of the second conductor with respect to a connecting surface (cs), and bending strength of the different conductor connecting part is greater than that of the second conductor, wherein, before the connecting of the first conductor and the second conductor, the second conductor is processed to achieve a volume rate equal to or less than a predetermined level by forming a melt penetration path to extend from a connecting surface (cs2) of the second conductor in a longitudinal direction of the second conductor.

12. The power cable system of claim 11, wherein a volume rate of the volume rate increase region of the second conductor is 98% or more in a range of at least 3 mm from the connecting surface (cs) in a longitudinal direction of the second conductor.

13. The power cable system of claim 11, wherein the first conductor is formed of copper or a copper alloy, and the second conductor is formed of aluminum or an aluminum alloy.

14. The power cable system of claim 11, wherein a diameter of the first conductor is less than that of the second conductor.

15. The power cable system of claim 14, wherein an O-ring with an inclined outer circumferential surface is bonded on the different conductor connecting part to finish a step caused by the difference in diameter between the first conductor and the second conductor to have an inclined surface.

16. The power cable system of claim 11, wherein the volume rate increase region of the first conductor is processed to increase a volume rate by a predetermined length before welding of the first conductor and the second conductor.

17. The power cable system of claim 16, wherein the first conductor is processed by a certain length from a connecting surface (cs1) thereof to achieve a volume rate of 98% or more before connecting with the second conductor.

18. The power cable system of claim 11, wherein the second conductor is processed to achieve a volume rate of 90% or less.

* * * * *